US007025481B2

(12) United States Patent
Moll

(10) Patent No.: US 7,025,481 B2
(45) Date of Patent: Apr. 11, 2006

(54) VEHICULAR LIGHTING SYSTEM

(75) Inventor: Gregory R. Moll, Alto, MI (US)

(73) Assignee: Nexlite, Grand Rapids, MI (US)

( * ) Notice: Subject to any disclaimer, the term of this patent is extended or adjusted under 35 U.S.C. 154(b) by 125 days.

(21) Appl. No.: 10/802,631

(22) Filed: Mar. 17, 2004

(65) Prior Publication Data

US 2004/0184276 A1 Sep. 23, 2004

Related U.S. Application Data

(60) Provisional application No. 60/455,474, filed on Mar. 18, 2003.

(51) Int. Cl.
*F21V 7/00* (2006.01)

(52) U.S. Cl. ...................... 362/487; 362/249; 362/250; 362/252; 362/485; 362/396; 362/225; 362/806

(58) Field of Classification Search ................ 362/487, 362/485, 249, 252, 250, 418, 806, 551, 396, 362/488, 219, 496, 225

See application file for complete search history.

(56) References Cited

U.S. PATENT DOCUMENTS

| | | | | |
|---|---|---|---|---|
| 3,404,268 | A * | 10/1968 | Fowler | 362/382 |
| 4,463,962 | A | 8/1984 | Snyder | 280/164 R |
| 4,482,944 | A * | 11/1984 | Roossine et al. | 362/418 |
| 4,607,317 | A * | 8/1986 | Lin | 362/249 |
| 4,947,293 | A | 8/1990 | Johnson et al. | 362/32 |
| 4,997,196 | A | 3/1991 | Wood | 280/87.042 |
| 5,023,762 | A | 6/1991 | Tieszen | 362/223 |
| 5,309,331 | A | 5/1994 | Anzai et al. | 362/80.1 |
| 6,039,458 | A | 3/2000 | Coates, Jr. et al. | 362/249 |
| 6,152,586 | A | 11/2000 | Dealey, Jr. et al. | 362/485 |
| 6,158,882 | A | 12/2000 | Bischoff, Jr. | 362/488 |
| 6,190,027 | B1 | 2/2001 | Lekson | 362/495 |
| 6,250,785 | B1 | 6/2001 | Mallia et al. | 362/511 |
| 6,273,587 | B1 | 8/2001 | Demnshki | 362/249 |
| 6,413,717 | B1 | 8/2002 | Anderson et al. | 362/31 |
| 2002/0131273 | A1 | 9/2002 | Tufte | 362/477 |
| 2002/0159741 | A1 | 10/2002 | Graves | 385/133 |
| 2003/0112627 | A1 * | 6/2003 | Deese | 362/249 |

FOREIGN PATENT DOCUMENTS

| | | |
|---|---|---|
| FR | 2620396 | 3/1989 |

* cited by examiner

*Primary Examiner*—Thomas M. Sember
*Assistant Examiner*—James W Cranson, Jr.
(74) *Attorney, Agent, or Firm*—Van Dyke, Gardner, Linn & Burkhart, LLP

(57) ABSTRACT

A vehicular lighting system including an elongated mounting base having a body. The body has a central portion with a central bearing surface for contacting a mounting surface. The body includes a pair of flanges having upwardly depending portions extending from the central portion and downwardly depending portions extending from the central portion. The downwardly depending portions form bearing surfaces spaced from the central bearing surface for bearing on the mounting surface. The central portion includes an elongated groove extending along the base opposed from the central bearing surface. The elongated groove and inner surfaces of the flanges defining an elongated receptacle for a flexible light strip, which is positioned and retained in the receptacle by the flanges. The light strip is substantially contained within the receptacle and comprises a substantially transparent polymeric body with a plurality of light sources encapsulated in the polymeric body. The light strip includes contacts for electrically coupling the light sources to a power supply.

17 Claims, 26 Drawing Sheets

VEHICULAR LIGHTING SYSTEM

This application claims priority to U.S. provisional application entitled RUNNING LIGHT ASSEMBLY, filed Mar. 18, 2003, Ser. No. 60/455,474, by Applicant Gregory R. Moll, which is herein incorporated by reference in its entirety.

TECHNICAL FIELD AND BACKGROUND OF THE INVENTION

The present invention relates to a lighting system for a vehicle and, more particularly, to a lighting system that is particularly suitable for use as a running light for a vehicle, such as a tractor-trailer or truck or the like.

Running lights are typically formed from discrete lights, known as marker lights, which are individually wired and mounted to the exterior of a vehicle. Some trucks use a plurality of discrete marker lights in an effort to create a line of light along the upper edge or bottom edge of the truck trailer and also along the side of the cab. Historically, marker lights have been assembled using conventional incandescent light sources, which require a twelve-volt or greater voltage supply and, further, which generally have relatively short life expectancies, as in the case of most incandescent light sources. Furthermore, since each of these individual marker lights are typically individually wired, the cost of installation can be considerable. The greater number of lights, the greater the cost and the greater the demand on the truck's battery.

Consequently, there is a need for a simplified method of illuminating a vehicle that will provide sufficient, if not greater, illumination but with less power consumption and, preferably, at a lower cost than heretofore known.

SUMMARY

Accordingly, the present invention provides a lighting system that is simple to install and, further, that preferably incorporates light emitting diode technology, which requires far less power than incandescent light sources heretofore used and, which, generally have a longer life expectancy. Furthermore, the present invention provides a modular lighting system that can be customized with a simple interchange or addition of parts.

In one form of the invention, a lighting system includes a mounting base having a body. The body has a central portion with a central bearing surface for mounting to a vehicle mounting surface. The body includes a pair of flanges having upwardly depending portions extending from the central portion and downwardly depending portions extending from the central portion. The downwardly depending portions form bearing surfaces spaced from the central bearing surface for bearing on the mounting surface. The central portion includes an elongated groove extending along the base opposed from the central bearing surface. The elongated groove and inner surfaces of the flanges define an elongated receptacle for a flexible light strip, which is positioned and retained in the receptacle by the flanges. The light strip is substantially contained within the receptacle and comprises a substantially transparent polymeric body with a plurality of light sources encapsulated in the polymeric body. The light strip includes contacts for electrically coupling the light sources to a power supply.

In one aspect, the light sources comprise light emitting diodes. In further aspects, the polymeric body comprises a polyvinyl chloride body.

According to other aspects, the lower portions of the flanges and the central portion form therebetween recesses. For example, the recesses between the lower portions of the flanges and the central portion may comprise mounting openings to receive couplers.

Optionally, the lighting system includes two bases, with the bases being coupled by couplers, which extend into the mounting openings of the respective bases. For example, the couplers may comprise pins, such as coiled spring pins.

In yet other aspects, the lighting system further includes terminal end members, which couple to opposed ends of the base, for securing at least end portions of the base to the mounting surface. For example, the terminal end members may comprise elongate end caps, with each of the end caps having a mounting flange on one distal end and a shoulder on an opposed distal end thereof, and with the shoulders of the caps abutting the ends of the base. The shoulders preferably include axially extending projections extending therefrom, which extend into and couple to the ends of the base.

In a further aspect, the lower portions of the flanges and the central body of the base form therebetween recesses, with the projections of the end caps extending into the recesses for coupling the end caps to the base. For example, the recesses may comprise rounded recesses, with either the projections or the rounded recesses adapted to generate frictional engagement between the projections and the base. Preferably, the rounded recesses are adapted to generate frictional engagement between the end caps and the base. For example, the projections may be sized such that the lower portions of the flanges deflect when the pins are inserted into the rounded recesses to thereby generate frictional engagement between the end caps and the base. Alternately or in addition, the pins may be compressible.

According to yet another aspect, the lighting system further includes a light assembly to provide supplemental illumination to the light strip. The light assembly is mounted over the light strip and the base. In a further aspect, the light assembly includes a housing and at least one light source in the housing, with the light source adapted for coupling a power supply. In yet a further aspect, the housing includes a housing base, with the housing base having a transverse passage therethrough for receiving the light strip and the mounting base wherein the light assembly mounts over the light strip. Optionally, the light assembly may be mounted to an end portion of the mounting base to thereby form a terminal member for the mounting base.

According to another form of the invention, a light strip includes a base, a flexible light strip, and at least one end cap. The base includes an elongate body, which has an elongated groove and opposed distal ends. Each of the opposed distal ends has a pair of mounting recesses extending axially into the distal ends and extending generally parallel with the elongated groove. The flexible light strip is positioned and retained in the elongated groove by the body, with the light strip being substantially contained within the elongated groove. The end cap couples to one of the distal ends of the base and includes a shoulder on its distal end, which abuts the distal end of the base, and axially extending projections extending therefrom. The projections extend into the mounting recesses for coupling to the distal end of the base.

In one aspect, the elongated groove comprises an upper portion and a lower portion, with the light strip retained in the upper portion.

In another aspect, the elongated body has a central portion that includes a bearing surface for mounting to a mounting surface on a vehicle.

In another form of the invention, a vehicular lighting system includes a light assembly, which includes a housing, at least one light source positioned in the housing, and electrical leads for coupling the light source to a power supply of the vehicle. The housing is adapted to mount to a mounting surface of a vehicle. The vehicular lighting system also includes an elongate member and a light strip, which is positioned in an elongate groove of the elongate member. The light strip has a plurality of light sources that extend along the light strip and electrical leads or contacts for coupling its light sources to the power supply in the vehicle. The elongate member is adapted to mount to the mounting surface, with the light strip and the elongate member extending from the housing of the light assembly to thereby form a substantially continuous line of light that extends from said light assembly for illuminating a portion of the vehicle.

In one aspect, the lighting system further includes at least two light assemblies, with the elongate member and the light strip extending at least between the light assemblies to form a substantially continuous line of light between the light assemblies for illuminating a portion of the vehicle.

In other aspects, the elongate member comprises a first elongate member, and the vehicular lighting system further includes a second elongate member. The second elongate member is aligned with the first elongate member wherein the grooves of the second elongate member and the first elongate member are aligned to form a continuous groove and wherein the light strip extends along the continuous groove.

In a further aspect, the first elongate member and the second elongate member are coupled. For example, the first elongate member and the second elongate member may be coupled by pins that extend into respective recesses formed in the elongate members. The recesses may extend into ends of the first elongate member and the second elongate member wherein the pins are generally not viewable when the elongate members are coupled.

In addition, the first elongate member may extend from one side of the light assembly, with the second elongate member extending from another side of the light assembly.

In another aspect, the groove of the elongate member includes a recess for forming a raceway for conduiting electrical leads along the elongate member.

According to yet another embodiment, a vehicular lighting system includes first and second light assemblies, with each light assembly having a housing, at least one light source positioned in the housing, and electrical leads for coupling their respective light sources to a power supply of the vehicle. Each housing is adapted to mount to a mounting surface of a vehicle and over an opening in the mounting surface of the vehicle. The lighting system also includes an elongate member that is adapted to mount to the mounting surface. A light strip is positioned in an elongate groove of the elongate member, with the light strip having a plurality of light sources extending along the light strip. The light strip has electrical contacts for coupling to the power supply through one of the openings in the mounting surface of the vehicle. The elongate member extends between the light assemblies to thereby form a substantially continuous line of light that extends between the light assemblies for illuminating a portion of the vehicle.

In one aspect, the lighting system further includes an intermediate light assembly between the first and second light assemblies.

In other aspects, the elongate member comprises a first elongate member, with the vehicular lighting system further including a second elongate member and a second light strip. The second light strip is positioned in the groove of the second elongate member, with the second elongate member extending from one of the light assemblies.

In another aspect, the first elongate member and the second elongate member are coupled, for example, by pins extending into respective recesses formed in the elongate members.

In yet another aspect, the elongate member includes a plurality of mounting openings in its groove, with the mounting openings being located behind the light strip when the light strip in mounted in the groove.

It can be appreciated from the foregoing that the lighting system of the present invention provides an assembly that is relatively easy to install and customize. The lighting system will consume less energy than conventional marker lights and, further, will provide enhanced visibility to vehicles, such as trucks, that incorporate the lighting system of the present invention.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
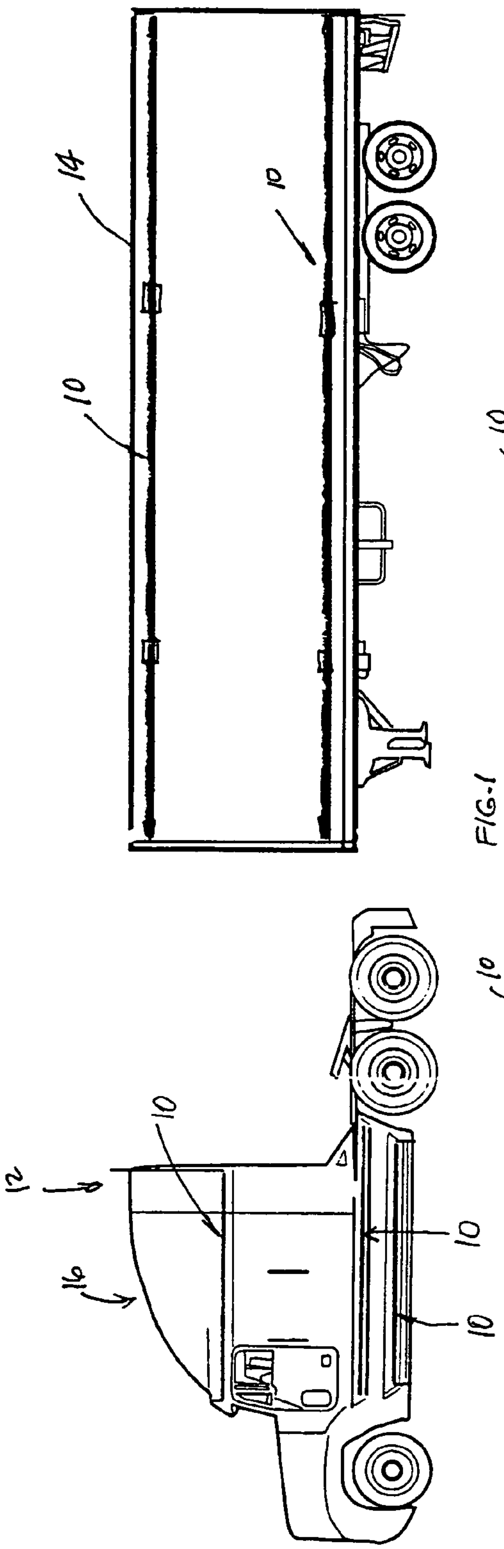
FIG. 1 is a side elevation view of a truck incorporating the lighting system of the present invention.
Figure 1B:
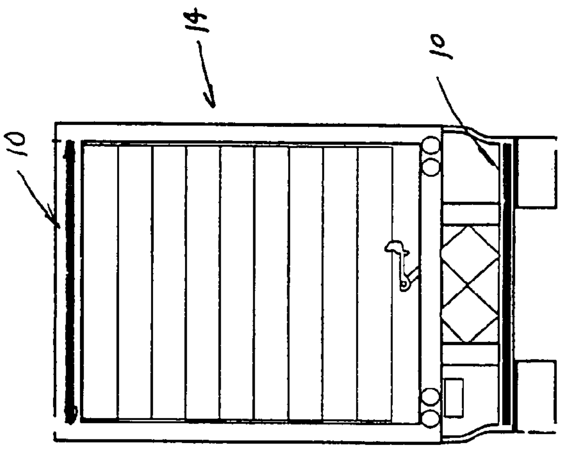
FIG. 1B is a rear elevation view of the truck of FIG. 1.
Figure 1A:
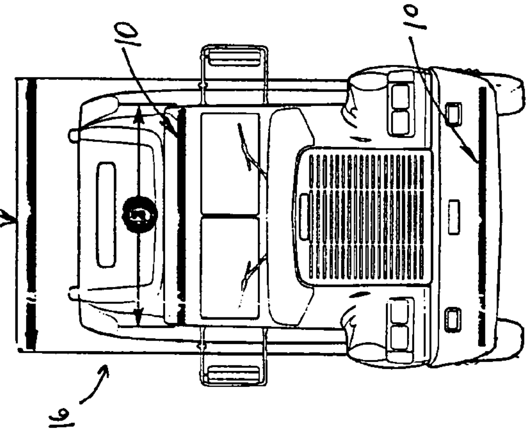
FIG. 1A is a front end elevation view of the truck of FIG. 1.

Referring to FIG. 1, the numeral 10 generally designates a lighting system of the present invention, which is particularly suitable for use on a vehicle, such as a tractor-trailer or truck 12. As best seen in FIG. 1, the lighting system 10 may be used to illuminate a portion of the vehicle and may be used, for example, as a running light and positioned at an upper edge of the truck's trailer 14; however, it may be appreciated that lighting system 10 may be positioned at a lower edge or intermediate portion of the trailer and, further, may be provided at the back end of the trailer and also on the body of the truck's cab 16. In addition, lighting system 10 may be used on other vehicles, including motorized or non-motorized vehicles, such as cars; campers; utility trailers; camping trailers; RVs; watercraft, including boats, personal watercrafts; snowmobiles; all terrain vehicles (ATVs) or the like; or on garage doors; building structures; signs or the like. However, for ease of description, reference hereinafter will be made to the mounting of lighting system 10 on a vehicle. As will be more fully described below, lighting system 10 preferably incorporates light emitting diode (LED) technology into a modular lighting system that permits the lighting system to be quickly and easily installed and, further, customized to suit the particular needs of the vehicle owner and, further, may be installed as an aftermarket product.

Figure 2:
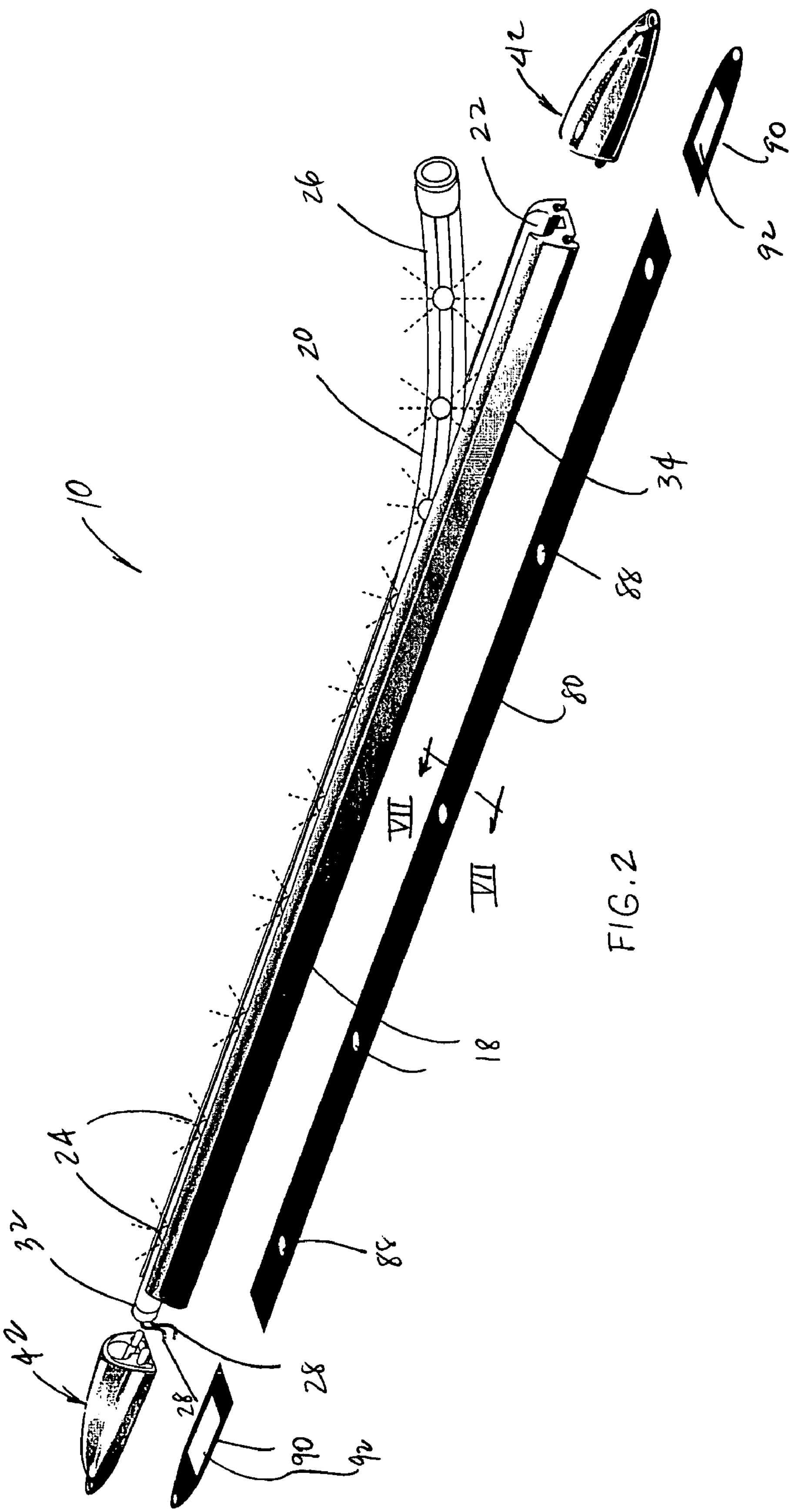
FIG. 2 is an enlarged exploded perspective view of a lighting system of the present invention.
Figure 2A:
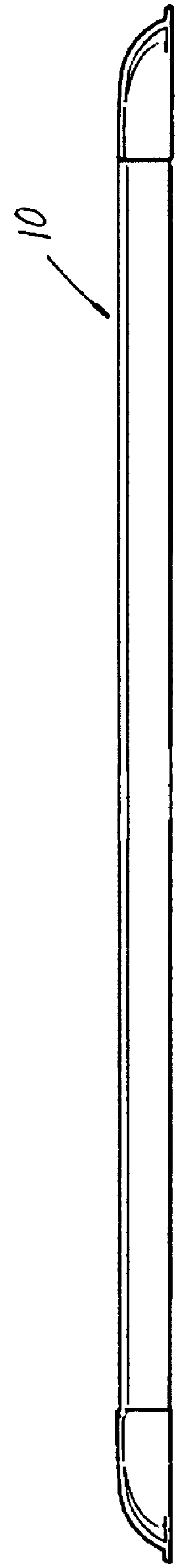
FIG. 2A is a side elevation view of the lighting system of FIG. 2.
Figure 2B:
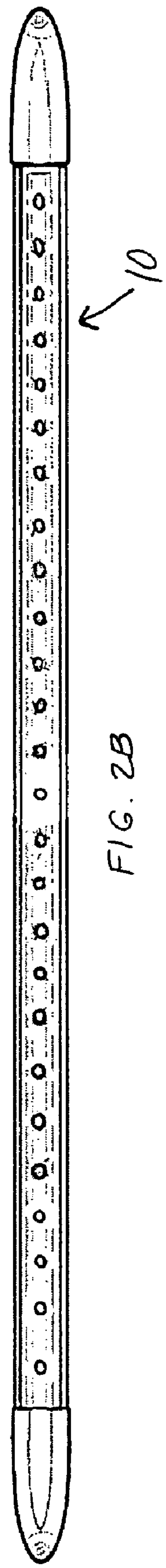
FIG. 2B is a plan view of the lighting system of FIG. 2A.
Figure 5:
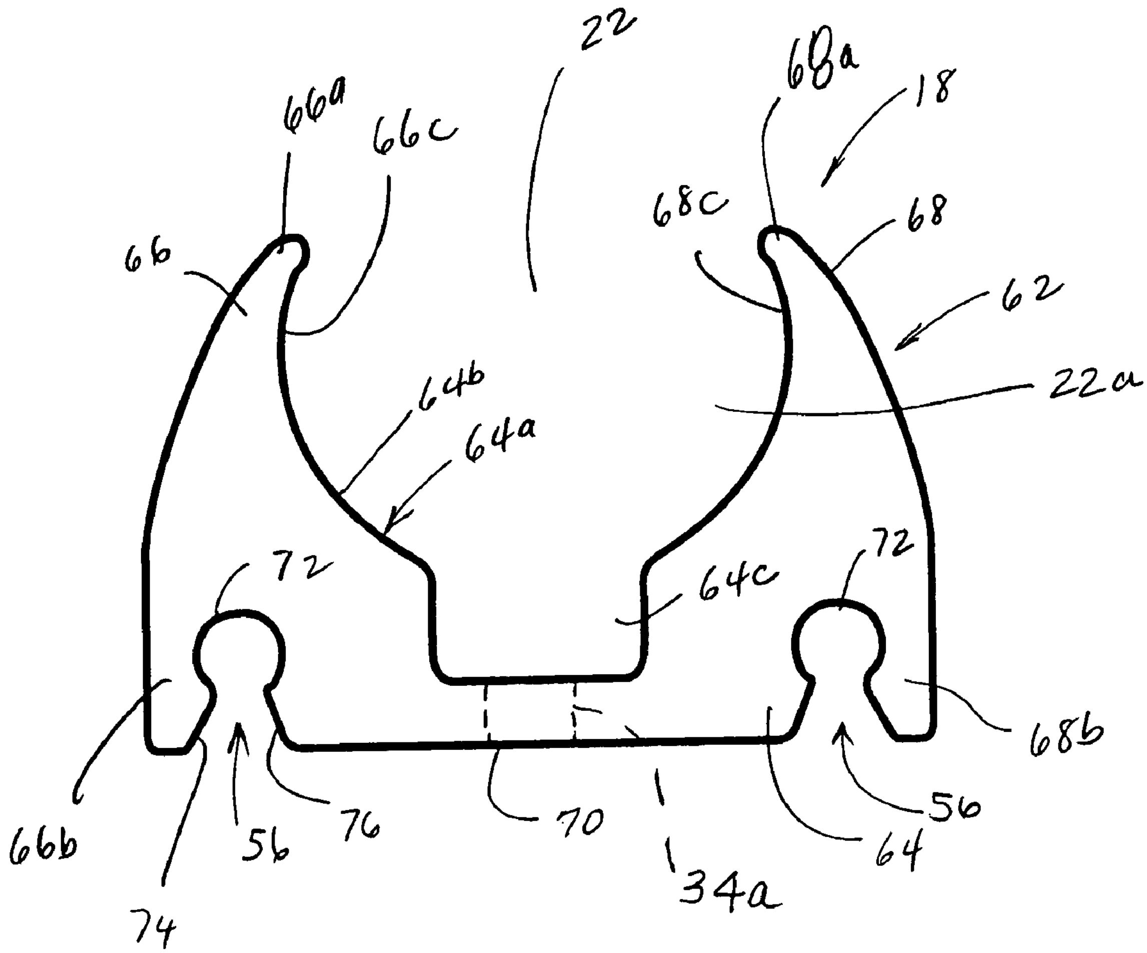
FIG. 5 is a cross-section view taken along line V—V of FIG. 3.
Figure 6:
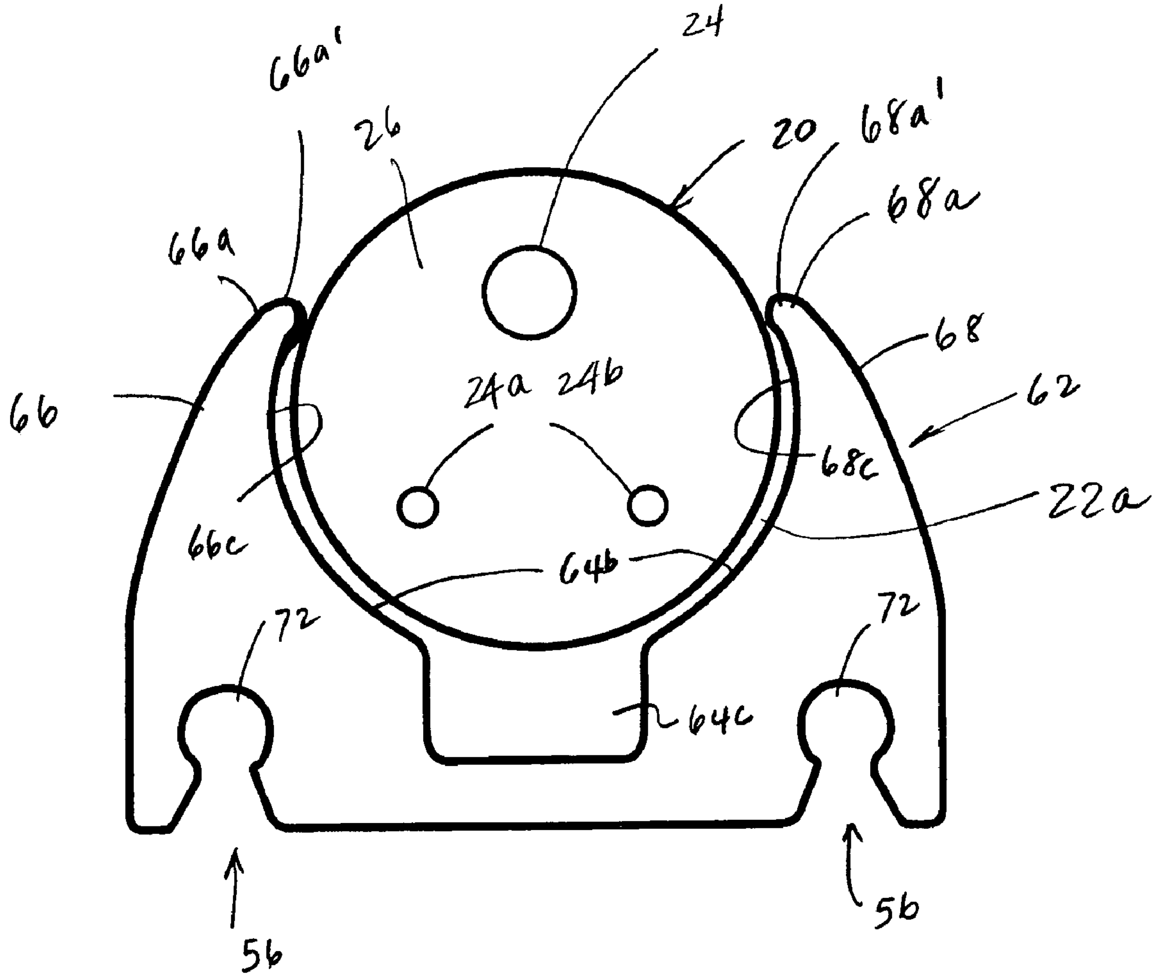
FIG. 6 is a cross-section view taken along line VI—VI of FIG. 2.

Referring to FIG. 2, lighting system 10 includes a base 18 and a light strip 20, which is positioned in an elongate groove 22 formed in base 18, as will be more fully described in reference to FIGS. 5 and 6. Base 18 is preferably an extruded elongate member and formed from a metal, such as aluminum or stainless steel, or a plastic, such as PVC, or a rubber material. The elongate member may be finished in a number of different ways. For example, the member may be coated, such as chrome plated, painted, polished, and/or anodized. As will be more fully described below, the length of the elongate members may be varied and may be used alone or in combination with one or more elongate members to thereby increase the overall length of system 10.

Preferably, light strip 20 comprises a flexible light strip that incorporates a plurality of light sources 24, such as LEDs, to illuminate the vehicle to which lighting system 10 is attached. It should be understood that light strip 20 may alternatively incorporate incandescent, fluorescent lights, fiber-optic cables, or the like. Light strip 20 preferably comprises a polymeric body 26 in which light sources 24 are encapsulated. For example, body 26 may comprise an extruded polymeric body, such as an extruded polyvinyl chloride body (PVC). A suitable light strip is commercially available from Neo Neon of Hong Kong or Lei Yueh Enterprise Co., Ltd, Taipei Taiwan.

As best understood from FIG. 2, light sources 24 are coupled to a circuit, which extends through body 26 and which is coupled to wire contacts 28 that exit body 26, for example, at end 32 for coupling to a power supply, such as the vehicle battery. The voltages for powering the respective lights may include 12-volt, 24-volt, 110-volt, 240-volt. It should be understood that the contacts may comprise socket-type contacts, which do not actually exit the body.

As noted above, base 18 comprises an elongate member with an elongate body 34, which as noted above is preferably formed, for example, from aluminum or stainless steel. However, it can be appreciated that other materials not enumerated above may be also used to form body 34. As best understood from FIG. 3, base 18 includes a plurality of spaced-apart mounting openings 34*a* (shown in phantom in FIG. 5) for receiving fasteners 38 that secure base 18 to a mounting surface on the vehicle. Mounting openings 34*a* are aligned along the central portion of elongate body 34 and, as will be more fully described below, are aligned under light strip 20 so that they will not be readily visible once system 10 is assembled and mounted to the vehicle. Suitable mounting surfaces include metal, fiberglass, aluminum, wood, plastic, or rubber mounting flanges. Furthermore, the end portions 40 of base 18 are coupled to terminal members 42, which are similarly mounted to the mounting surface of the vehicle by fasteners (not shown), to provide additional securement of base 18 to the vehicle mounting surface.

Figure 3:
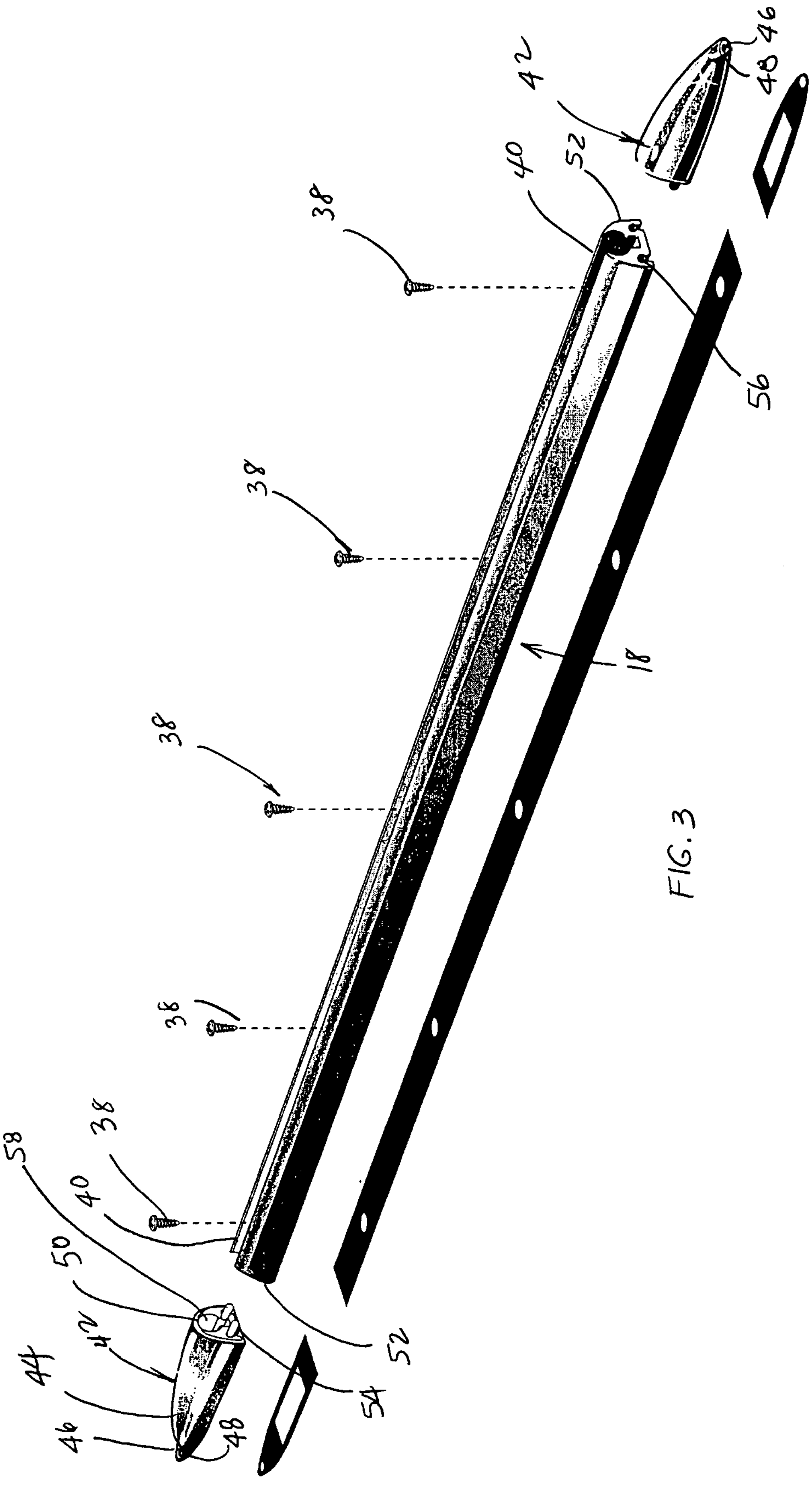
FIG. 3 is a similar exploded perspective view to FIG. 2, with the light strip removed for clarity.

As best understood from FIGS. 2 and 3, terminal members 42 include bullet-shaped bodies 44 that include on one end a mounting flange 46 with a mounting opening 48 for securing terminal member 42 to the vehicle. On its opposed end 50, each body 44 includes a shoulder that abuts the distal ends 52 of base 18. In addition, shoulders 50 include projections 54 that extend into corresponding recesses 56 formed in base 18, as will be more fully described in reference to FIGS. 5 and 6.

In the illustrated embodiment, projections 54 comprise pins or cylindrical members that frictionally engage base 18 to thereby axially couple terminal members 42 to base 18. In addition, each body 44 includes passageway 58 into which the end (32) of light strip 20 extends for coupling contacts 28 to a voltage supply, such as the vehicle battery. Preferably, at least one of the terminal members 42 is positioned over an opening formed in the mounting surface of the vehicle and, further, includes a passageway of an opening 59 (FIG. 9) though which contacts 28 make electrical connection with the voltage supply.

Figure 4:
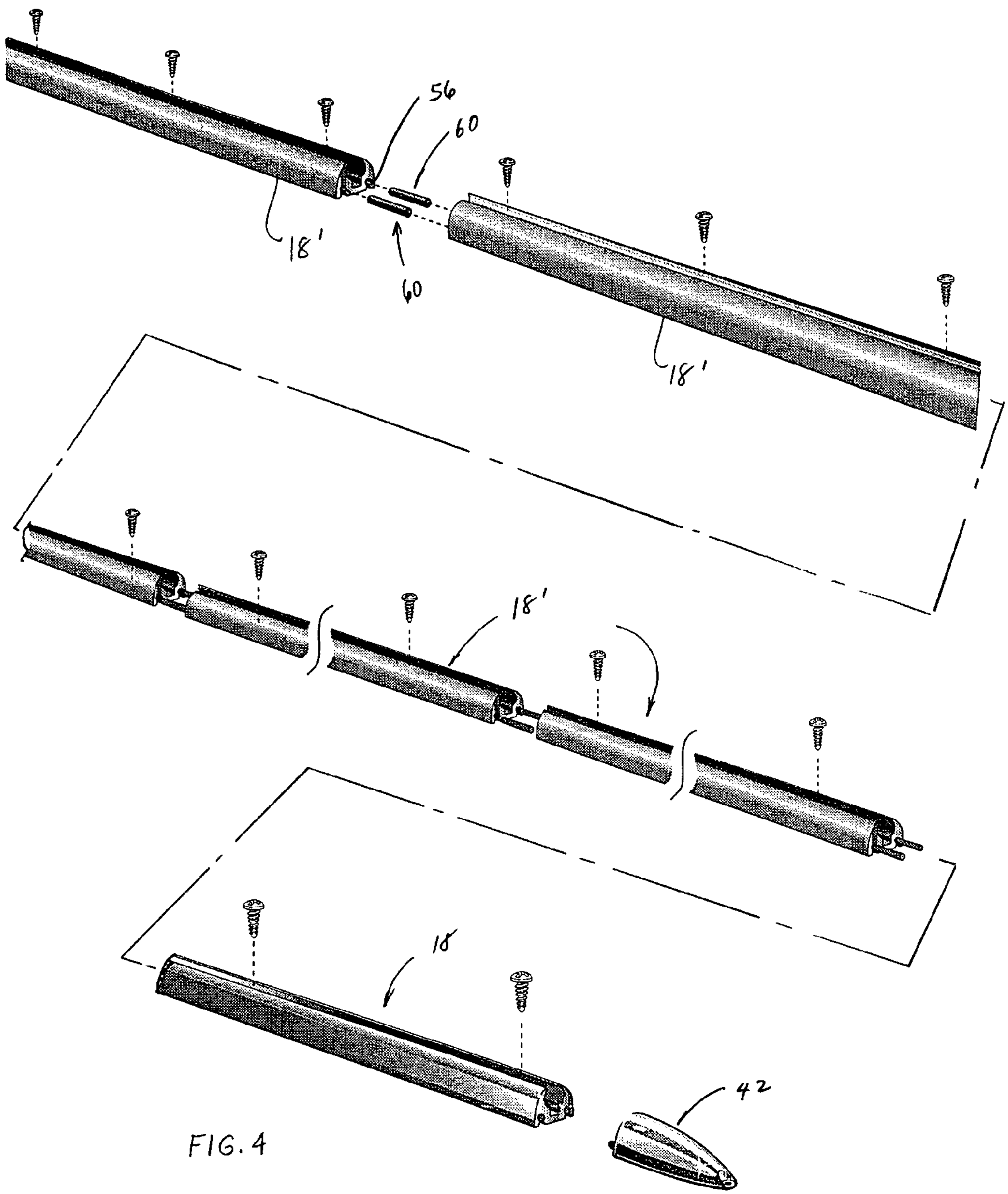
FIG. 4 is an exploded perspective view of the lighting system illustrated in FIG. 3, with extensions to increase the length of the lighting system.

Referring to FIG. 4, base 18 may be coupled with additional bases 18', which are of similar construction to base 18, to increase the length of lighting system 10. The respective bases (18, 18') are interconnected by couplers 60, which extend into the respective recesses 56 of bases 18, 18'. Couplers 60 preferably comprise pins and, more preferably, comprise coiled spring pins, which provide frictional engagement between the respective couplers and the respective bases. Suitable coiled spring pins are available from Vogelsang of Germany. Coil pins offer a wider range of hold tolerances and, further, conform better to out-of-round or tapered recesses or holes. Furthermore, the pins absorb shock and vibrations to permit relative movement of the bases due to the vehicle's vibration or the like.

Referring to FIG. 5, base 18 (which is of similar construction to base 18') is formed from elongate body 34, preferably as noted above, an extruded elongate member. Body 34 includes a central portion 64 and a pair of flanges 66 and 68. Each flange 66, 68 includes an upwardly depending portion **66*a* and 66*b*, respectively, and a downwardly depending portion 66*b* and 68*b*, respectively, which extend from central portion 64. As best understood from FIG. 5, flanges 66 and 68 are integrally formed with central portion 64 and together with central portion 64 define elongate groove 22. Groove 22 is formed between inwardly facing surfaces 66*c* and 68*c* of flanges of 66 and 68, respectively, and, further, by a recess 64*a* formed in central portion 64. Recess 64*a* includes an upper portion 64*b* and a lower portion 64*c*, with upper portion 64*b* together with inwardly facing sides 66*c* and 68*c* of flanges 66 and 68 for forming an elongate receptacle 22*a* for receiving light strip 20. As will be more fully described below, lower portion 64*c* of recess 64*a*** may be used for conduiting wiring or the like.

Central portion 64 includes a generally planar lower surface 70, which provides a central bearing surface for contacting the mounting surface of the vehicle. Downwardly depending portions **66*b* and 68*b* of flanges 66 and 68 are spaced from surface 70 and similarly provide bearing surfaces and, further, therebetween define recesses 56. As best seen in FIG. 5, recesses 56 comprise keyhole-shaped recesses with an upper rounded recess portion 72 and a pair of angled sides 74 and 76, which may be used as a bearing surface for inserting couplers or the like into recess 56. Further, sides 74 may provide cam surfaces to deflect downwardly depending portions 66*b* and 68*b* of flanges 66 and 68 outwardly upon insertion of a coupler to thereby lock the respective coupler into rounded recess portion 72 when the coupler is seated in the rounded recess portion. Furthermore, when coupling, for example, terminal members 42 to base 18 or adjacent base sections (18'), the respective coupler preferably has a slightly larger diameter than the diameter of the rounded recessed portion 72** to thereby provide a frictional engagement between the respective coupler and the base.

Referring to FIG. 6, light strip 20 is positioned in elongate receptacle **22*a* of groove 22 and, further, is held in position by upwardly depending portions 66*a* and 68*a* of flanges 66 and 68. Preferably, the diameter of light strip 20 is slightly larger than the space or opening between the upper edges of flanges so that when inserted, flanges 66 and 68 deflect outwardly and then return to their undeflected state after light strip 20 is positioned in groove 22. Optionally, light strip 20 may be sized such that upwardly depending portions 66*a* and 68*a* at least partially compress the polymeric body 26 forming light strip 20 to thereby frictionally retain light strip 20 in base 18**.

Furthermore, as can be appreciated from FIG. 6, light sources 24 are preferably positioned at or above the upper edges **66*a*' and 68*a*' of flanges 66 and 68 while still having light strip 20 substantially retained in receptacle 22*a*. Furthermore, as shown in FIG. 6, the wire leads 24*a* and 24*b*, which are used to power the respective light sources 24, extend through polymeric body 26, preferably below light sources 24 to limit the interference with the light projected from the respective light sources 24. Where more than one light strip is used, for example, the contact wires may be extended through the lower portion 64*c* of recess 64*a*** for coupling to the power supply.

As noted above, body 34 may be formed from a metal extrusion in which case inner surface **66*c* and 68*c* may provide reflective surfaces for the light that is directed inwardly from the respective lights sources 24 to thereby increase the light output of lighting system 10**.

Figure 7:
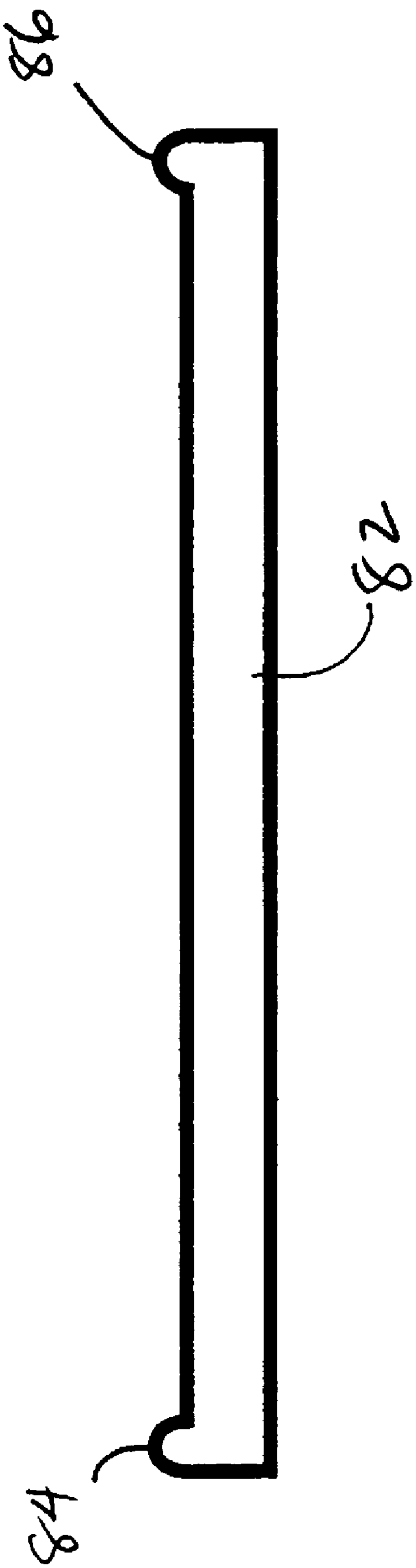
FIG. 7 is a cross-section view taken along line VII—VII of FIG. 2.

Referring again to FIGS. 2, 3, and 7, lighting system 10 optionally includes a gasket 80 for positioning between base 18 and the mounting surface of the vehicle. For example, the gasket may comprise a compressible material, including a rubber material, and preferably includes a generally planar cross-section 82 with upwardly extending ribs or flanges 84 and 86 for positioning on either side of base 18. In this manner, when base 18 is secured to the respective mounting surface of the vehicle, gasket 80 will be held in place by the compressive force of the respective fasteners that secure the base to the mounting surface and in addition by ribs or flanges 84 and 86, which make contact with the outer surfaces of downwardly depending portions **66*b* and 68*b* of flanges 66 and 68. Furthermore, as can be appreciated from the FIGS. 2 and 3, gasket 80 includes a plurality of openings 88, which align with the respective mounting openings of base 18 to permit the fasteners to extend through the gasket to the mounting surface of the vehicle. Similarly, terminal members 42 include gaskets 90 associated therewith, which have a similar cross-section to gasket 80 but whose shape follows the general bullet shape of the respective terminal members 42. Furthermore, gaskets 90 have an enlarged central opening 92 to permit the wiring from the vehicle to pass through for connection to the contacts of the respective light strip 20** or vise-versa.

Figure 10:
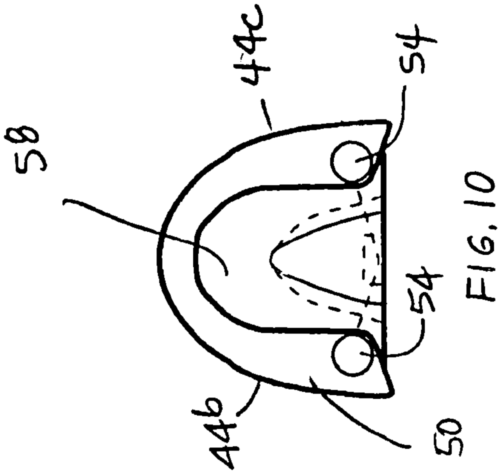
FIG. 10 is a right end elevation view of the terminal end cap of FIG. 8.
Figure 8:
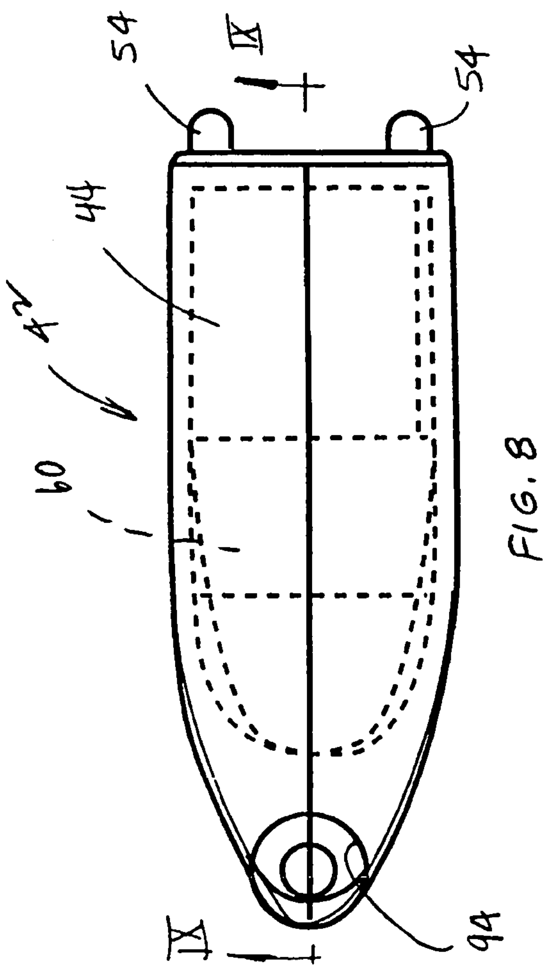
FIG. 8 is an enlarged plan view of the terminal end cap illustrated in FIGS. 2–4.
Figure 9:
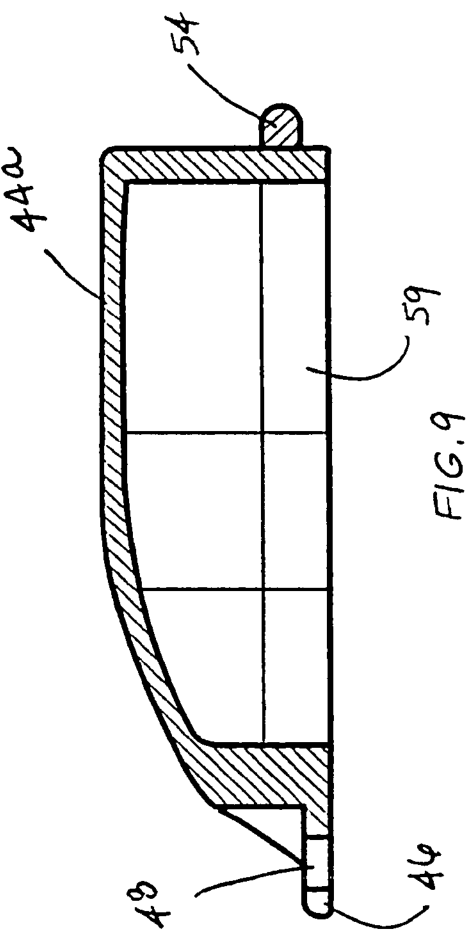
FIG. 9 is a cross-section view taken along line IX—IX of FIG. 8.

As previously noted and as best seen in FIGS. 8–10, terminal members 42 have a generally bullet-shaped body 44. Body 44 comprises a shell with an upper wall **44*a* and downwardly depending side walls 44*b* and 44*c* with a shoulder 50 extending inwardly from upper wall 44*a* and side walls 44*b* and 44*c*. Flange 46 is formed on an opposed end from shoulder 50 and is formed from a circular cutout 94 formed or otherwise provided in body 44. As previously noted, body 44 includes a lower central opening 59 which provides a communication path between the light strip 20** and the voltage supply, for example, the vehicle battery. Furthermore, as previously noted, shoulder 50 includes a plurality of projections or pins 54 that are provided on either side of opening 58 for coupling the terminal member 42 to base 18. Body 44 may be formed from a metal material, such as aluminum, zinc, or a plastic material, such as PVC, or a rubber material, with projections 54 comprising the same material as body 44 or a different material from body 44, for example a compressible material, including a compressible polymeric material or the like.

Figure 11:
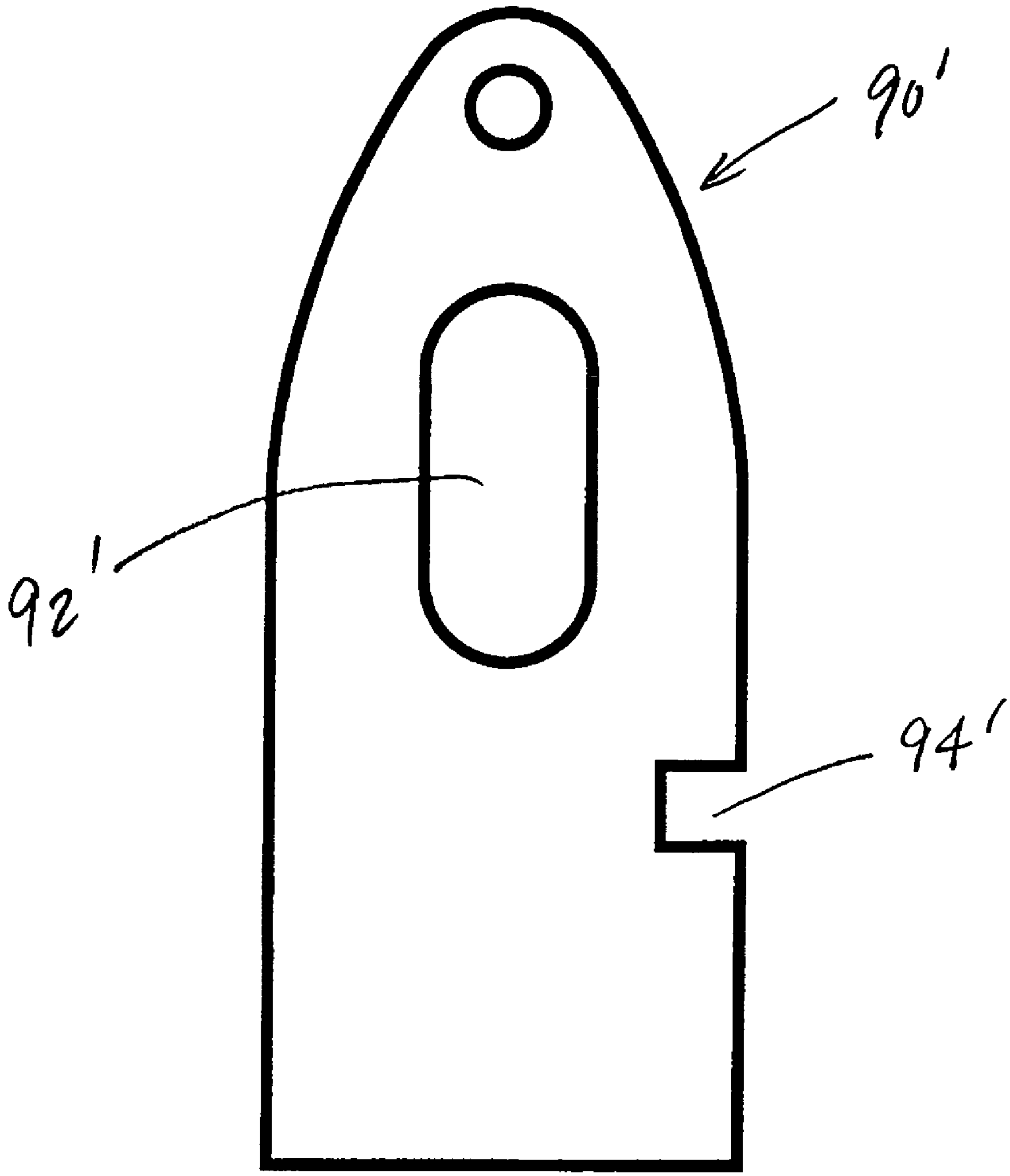
FIG. 11 is a plan view of the gasket for the end cap of FIGS. 8–10.

Referring to FIG. 11, the numeral 90' illustrates another embodiment of the gasket for the terminal member 42, which incorporates a smaller central opening 92' and a notch 94', which is preferably in line with the lower side of the terminal member 42 to provide for water egress. It should be understood, that the shape and the configuration of the gaskets may be varied to accommodate different shaped terminal members or to include multiple central openings to provide separate access passageways or communication passageways between the light strip and the voltage supply.

Figure 12:
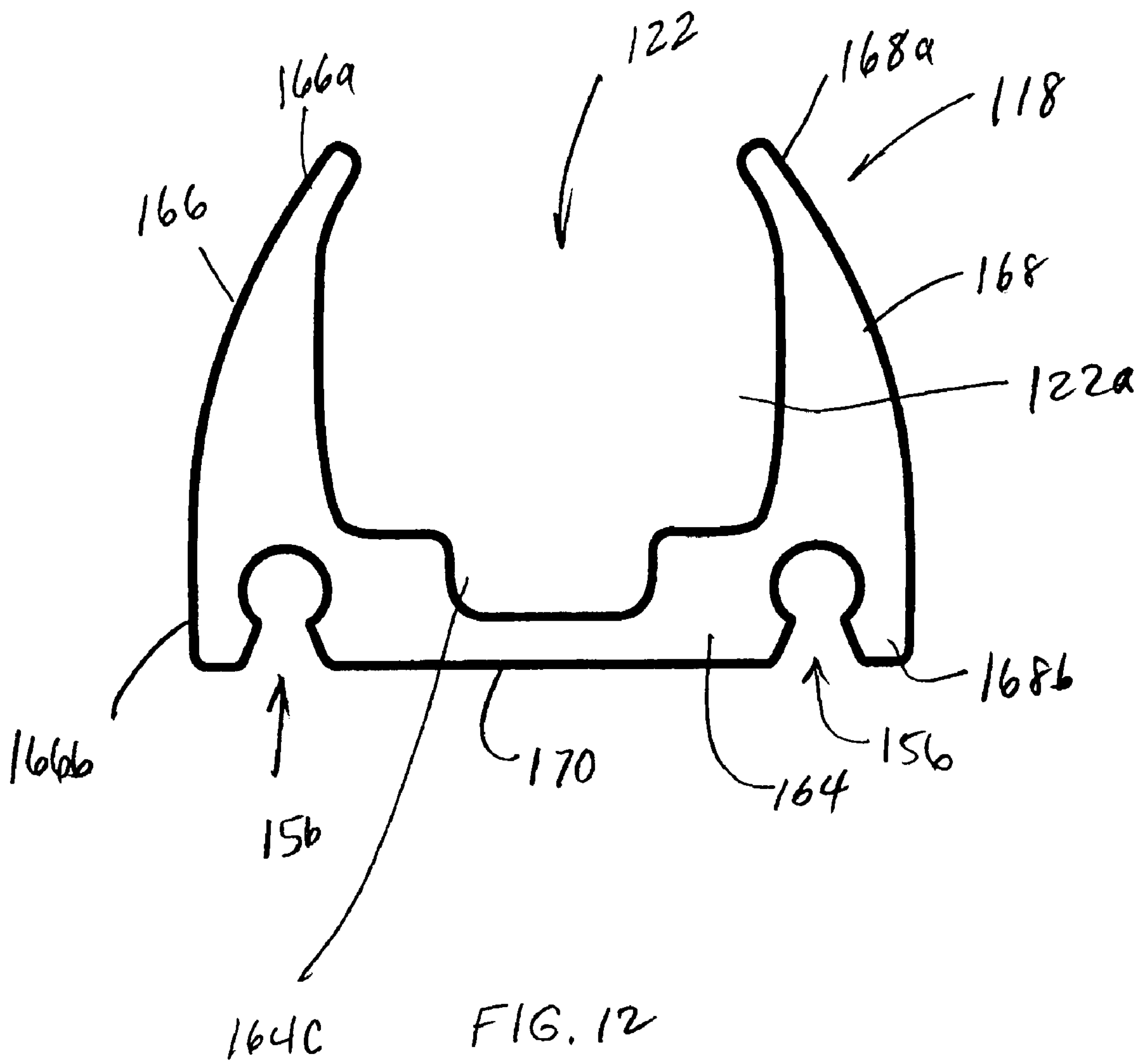
FIG. 12 is a cross-section view of yet another embodiment of the base of the lighting system of FIG. 2.
Figure 13:
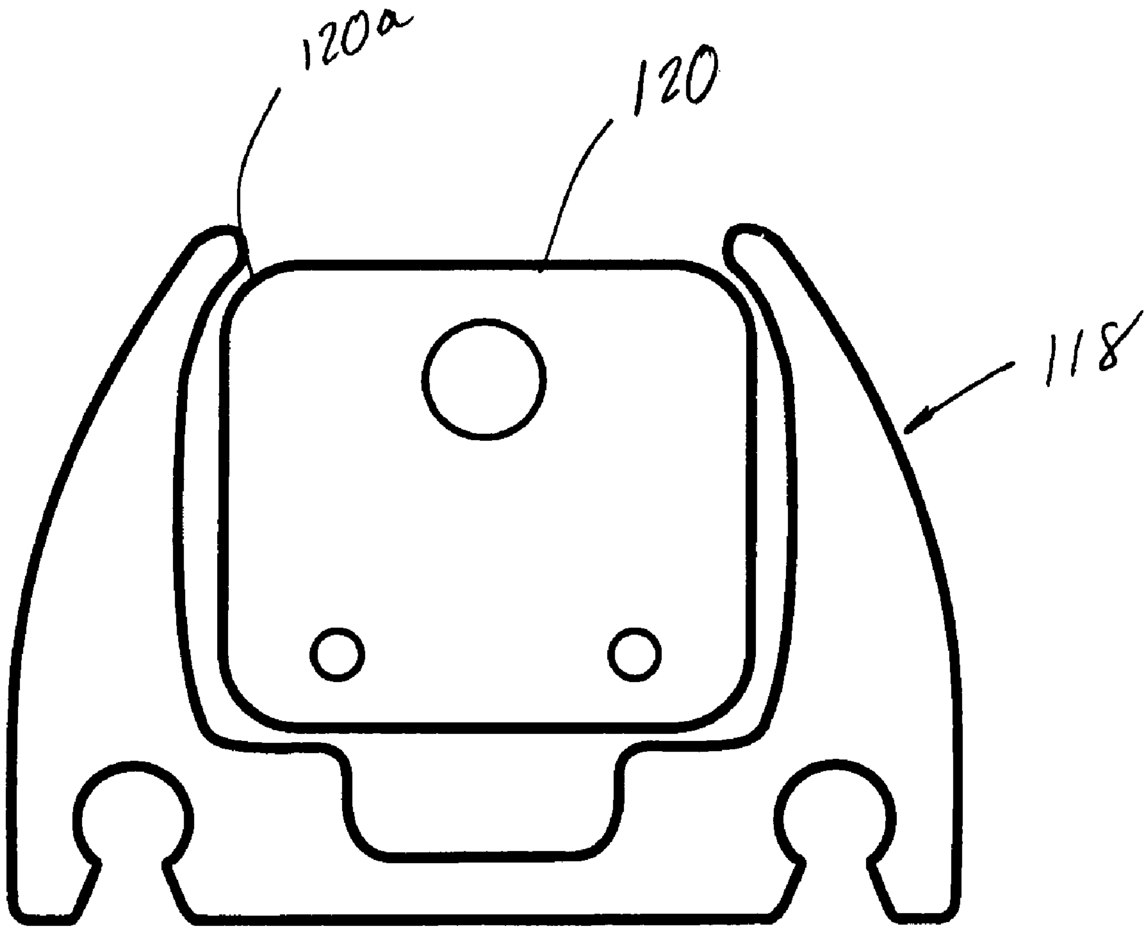
FIG. 13 is a similar view to FIG. 12 illustrating another embodiment of a light strip positioned in the base of FIG. 12.

Referring to FIG. 12, the numeral 118 generally designates another embodiment of the base of the lighting system of the present invention. Base 118 is of similar construction to base 18 and includes a central portion 164 and a pair of flanges 166 and 168. Flanges 166 and 168, respectively, include upwardly depending portions **166*a*, 168*a* and downwardly depending portions 166*b* and 168*b*. Similarly, downwardly depending portions 166*b* and 168*b* are spaced from a lower surface 170 of central portion 164 to define therebetween recesses 156, which are similar configuration to recesses 56. In the illustrated embodiment, elongated groove 122 comprises a generally square-shaped upper portion 122*a* that forms a receptacle and a rectangular-shaped lower recess 164*c*, which optionally provides a wiring chase for the lighting system of the present invention. As best seen in FIG. 13, light strip 120 has a generally square cross-section with rounded edges 120 with rounded comers 120*a* for positioning in generally square receptacle 122*a*. Similar to the previous embodiment, light strip 120 is preferably retained in receptacle by flanges 166 and 168**.

Figure 14:
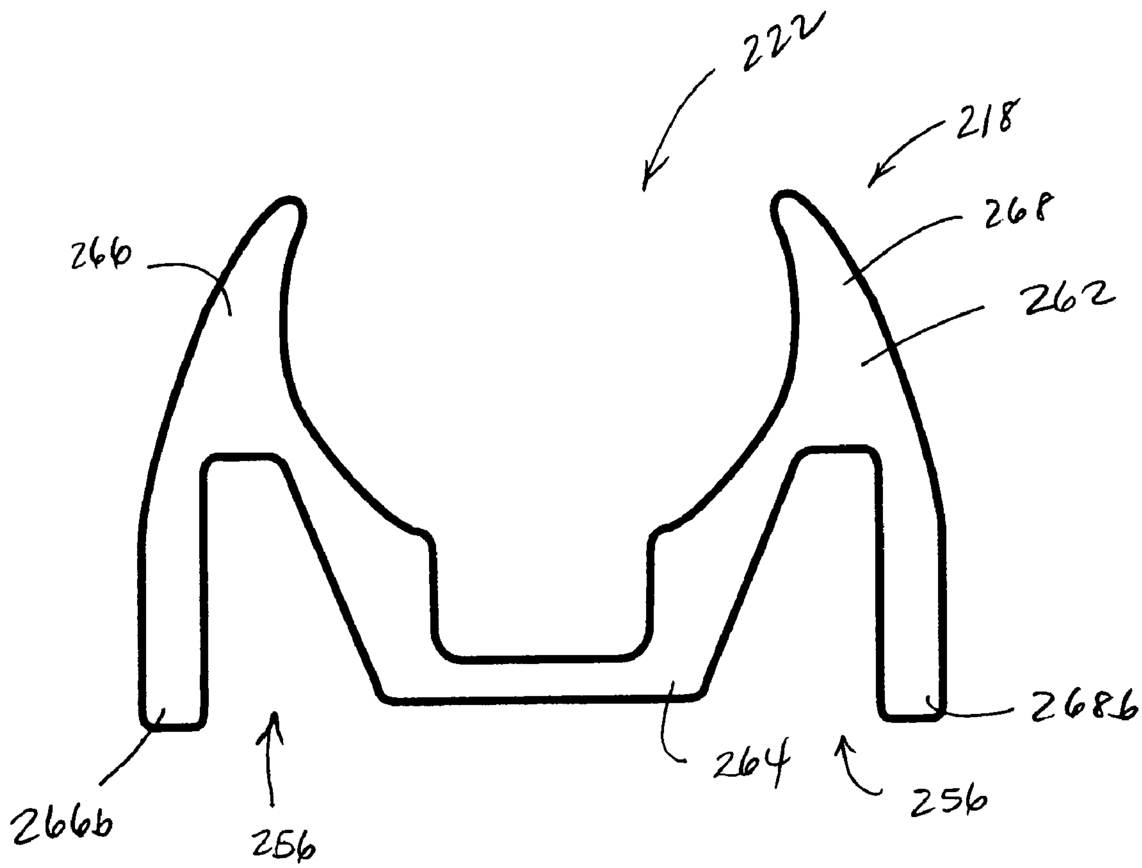
FIG. 14 is a cross-section view of another embodiment of the base of the lighting system of the present invention.
Figure 15:
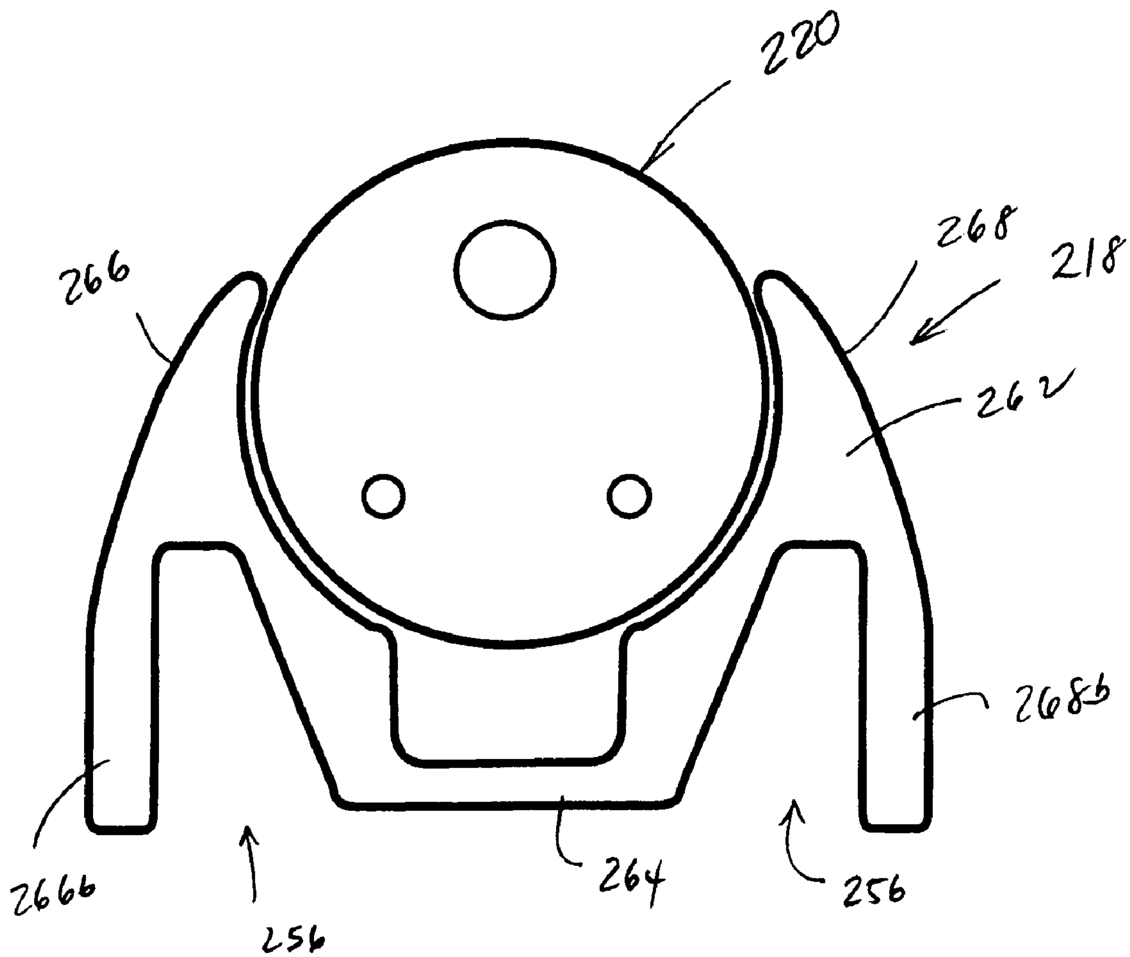
FIG. 15 is a similar view to FIG. 14 illustrating a light strip positioned in the base of FIG. 14.
Figure 18:
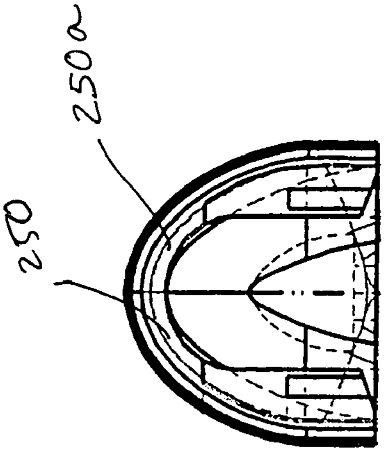
FIG. 18 is a right end elevation view of the terminal end cap of FIG. 16.
Figure 16:
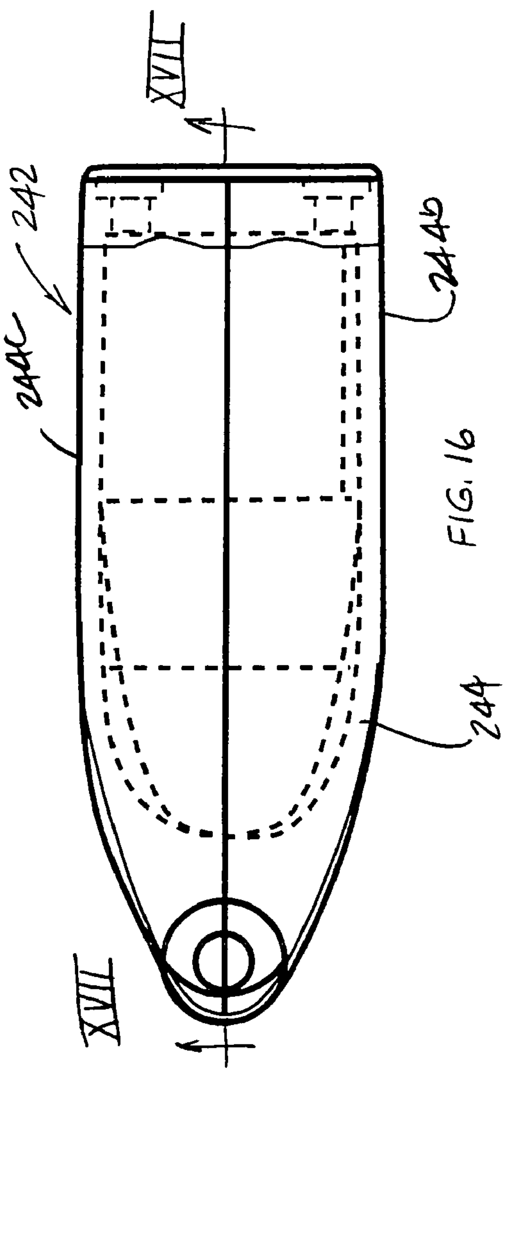
FIG. 16 is a plan view of an alternate embodiment of a terminal end cap of the present invention.
Figure 17:
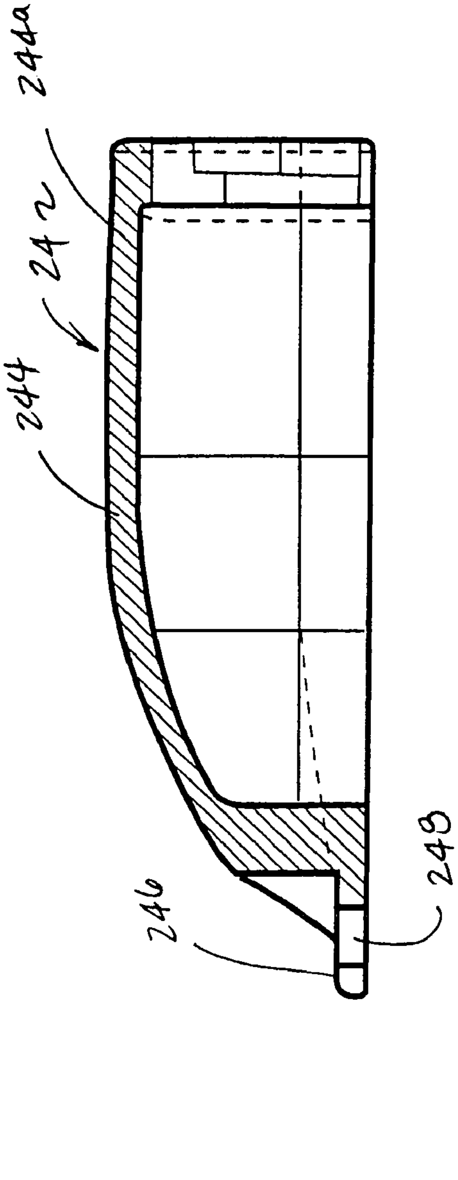
FIG. 17 is a cross-section view taken along line XVII—XVII of FIG. 16.
Figure 19:
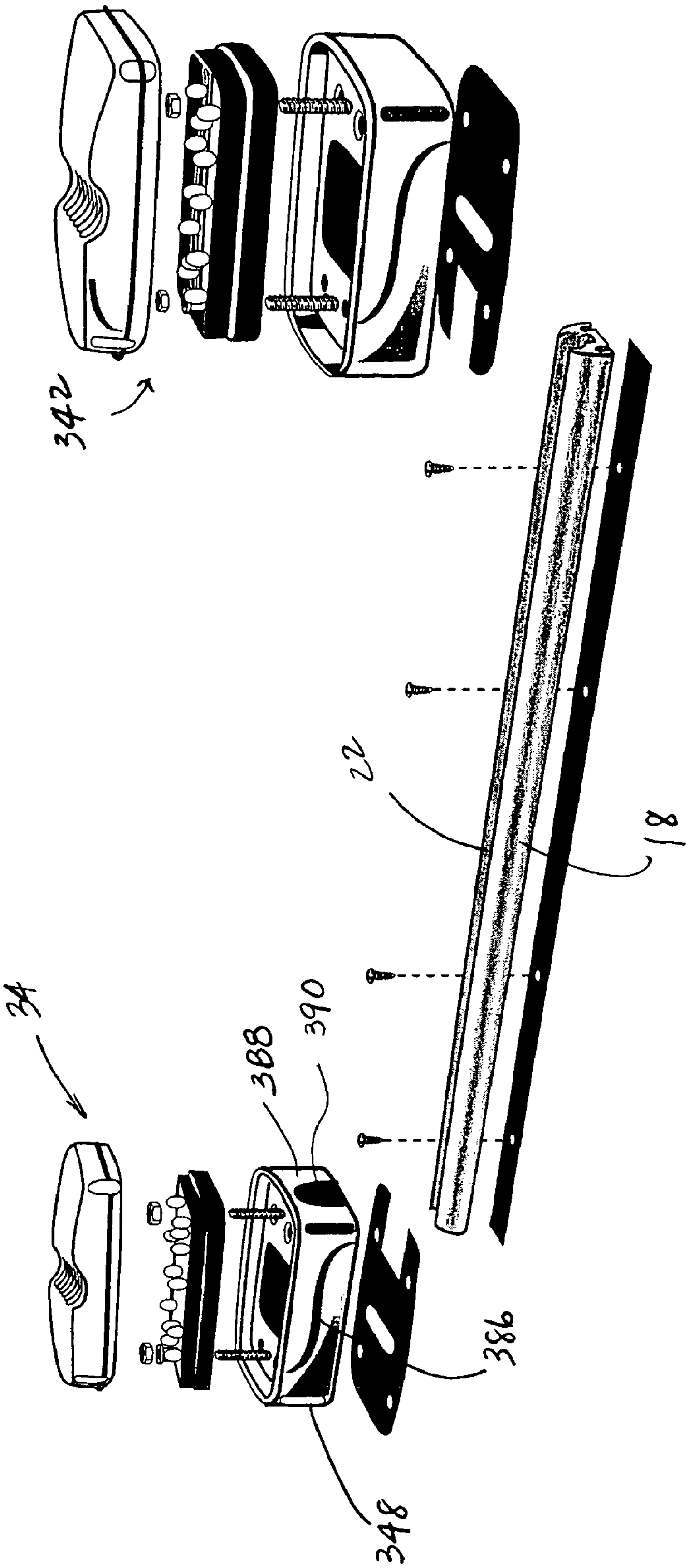
FIG. 19 is an exploded perspective view of yet another embodiment of the lighting system of the present invention incorporating additional light assemblies.
Figures 19A, 19B, 19C:
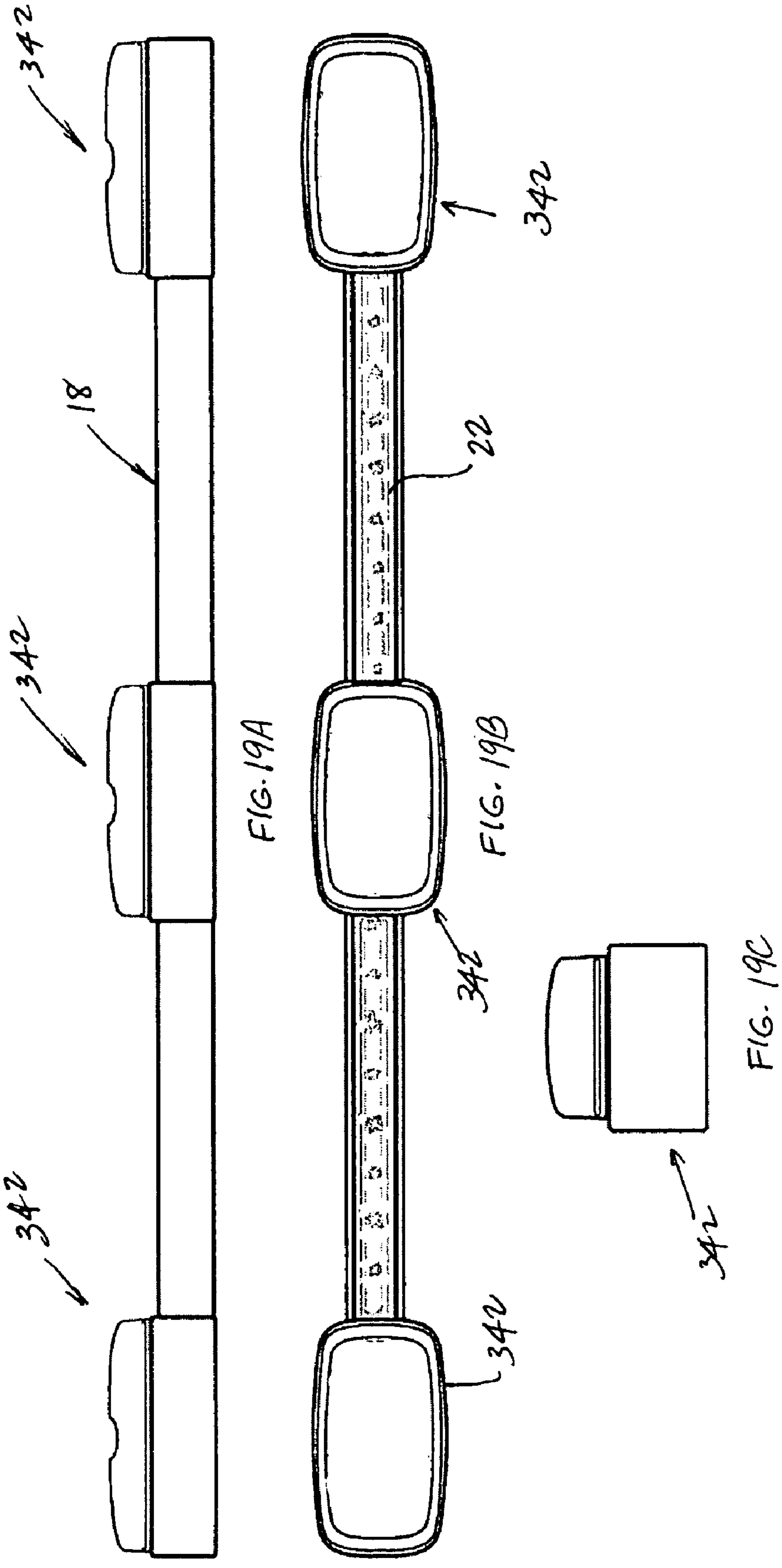
FIG. 19A is a side elevation view of a lighting system similar to the lighting system illustrated in FIG. 19 with an intermediate light assembly.
FIG. 19B is a plan view of the lighting system of FIG. 19A.
FIG. 19C is an end view of the lighting system of FIGS. 19A and 19B.

Referring to FIGS. 14 and 15, the numeral 218 generally designates another embodiment of the base of the present invention. Base 218 is formed from an elongate body 262 which includes a central portion 264 and flanges 266 and 268. Body 262 has a similar cross-section to body 34 of the first embodiment but includes enlarged trapezoidal-shaped recesses 256 that are formed between downwardly depending portions **266*b* and 268*b* of flanges 266 and 268, respectively, and central portion 264. Elongate groove 222 is a similar cross-section to groove 22 and is adapted for holding light strip 220, which is of similar construction to light strip 20**, therein.

To mount base 218 to the mounting surface of the vehicle, central portion 264 similarly includes a plurality of mounting openings extending along the longitudinal extent of the base. In addition, the terminal ends of the respective base are coupled to terminal members 242'. Terminal members 242 are of similar construction to terminal members 42 and include a bullet-shaped body 244 with a mounting flange 246. Flange 246 includes a mounting opening 248 for receiving a fastener. Body 244 further includes a shoulder 250, which extends downwardly and inwardly from upper wall **244*a* and side walls 244*b* and 244*c* of body 244. Shoulder 250 comprises a recessed shoulder 250*a*** for receiving the terminal end of the respective base and which is adapted to interlock with the terminal end of the respective base for securing the terminal end of the base to the mounting surface of the vehicle.

In other aspects of the present invention, such as illustrated in FIGS. 19–29, the lighting system of the present invention may include additional light assemblies, including as marker lights, such as regulated by the Department of Transportation under Federal Motor Vehicle Safety Standard (FMVSS) 108. While only two types of marker lights are illustrated herein, other marker lights may be used, including round, oval, triangular, and other shaped marker lights. For example, base 18 may be combined with light assemblies 342 or light assemblies 442, which provide supplemental lighting to light strip 20 positioned in groove 22 (shown in FIGS. 2 and 3) and, further, may provide terminal members and/or intermediate members for the respective base.

Figure 20:
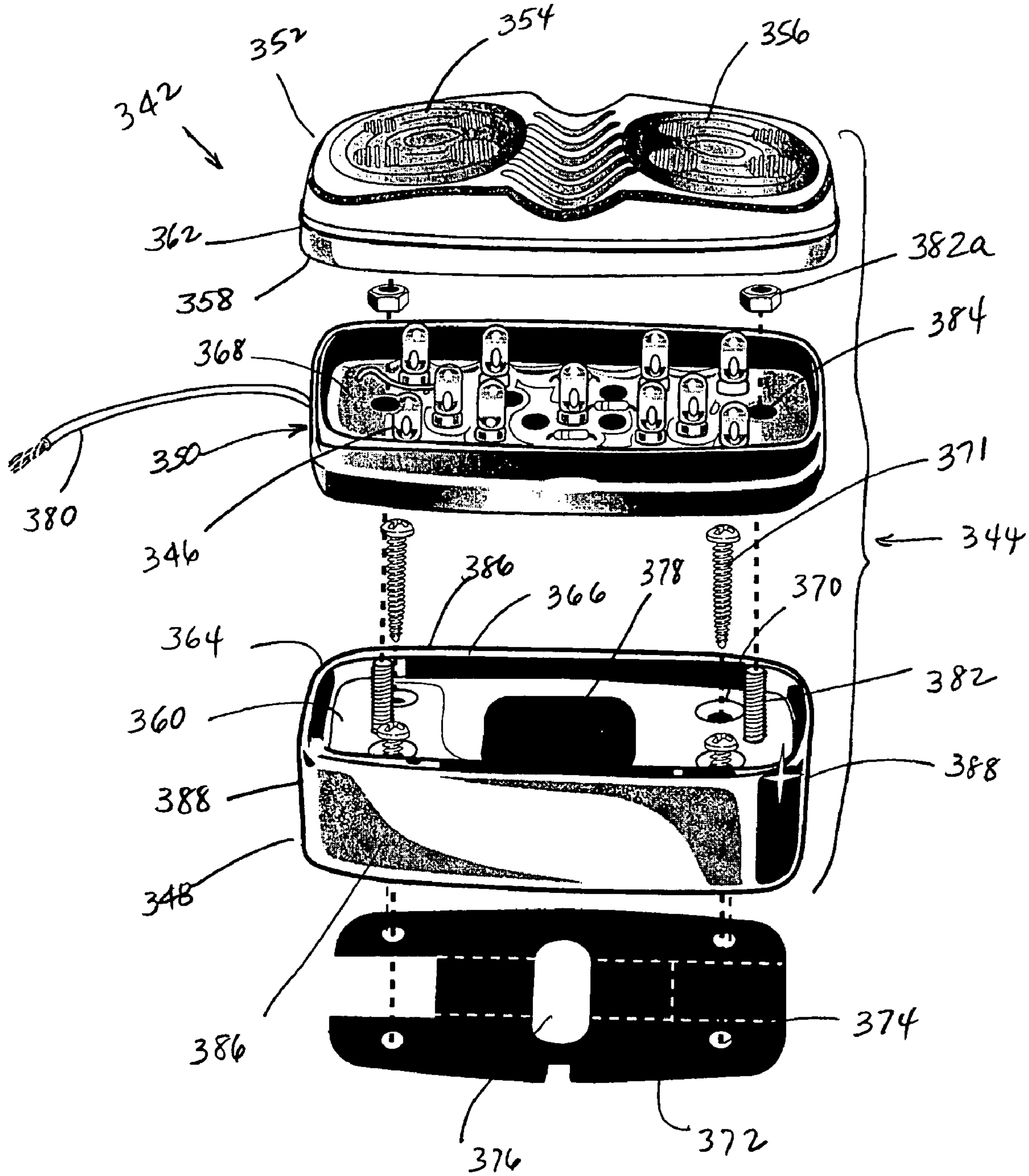
FIG. 20 is an exploded perspective view of one of the light assemblies of FIG. 19.
Figure 23:
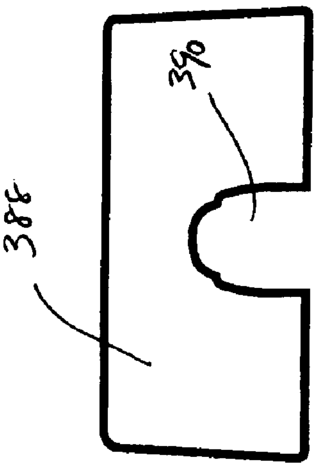
FIG. 23 is an end view of the base of FIGS. 21 and 22.

Referring to FIG. 20, light assembly 342 includes a housing 344, which encloses one or more light sources 346, such as LEDs, including high intensity LEDs. Alternately, the light sources may comprise incandescent or fluorescent light sources. Housing 344 includes a base 348 and a frame 350 for supporting light sources 346 and their supporting circuitry. Housing 344 further includes a cover 352, preferably a cover with light directing surfaces, such as lens portions 354 and 356, which may be configured as desired to produce a desired light pattern from light sources 346. Cover 352 preferably comprises a plastic cover that includes a downwardly depending perimeter flange 358 that encircles and encloses frame 350. When assembled, cover 352 and 350 are inserted into a recess 360 formed in base 348, with flange 358 extending into recess 360. Preferably, cover 352 includes a seal 362 that projects outwardly from flange 358 and rests on shoulder 364 of flange 366 of base 348 when mounted therein to seal the light assembly.

Frame 350 includes a central web 368 on which light sources 346 are mounted and, further, which support the circuitry for powering the respective light sources. As best understood from FIG. 20, base 348 includes a plurality of mounting openings 370 for securing base 348 by fasteners 371 to the mounting surface of the vehicle preferably over a gasket 372. In addition, light assembly 342 is preferably aligned over an opening in the mounting surface of the vehicle through which the electrical leads for powering light sources 346 and for powering the light sources of light strip 20 may be extended for coupling to the vehicle electrical system and/or power supply. Furthermore, base 348 includes a central opening 378, which permits the communication between the wiring 380 of the light circuit or circuitry mounted in frame 350 with the vehicle electrical system and/or power supply, such as the vehicle battery, similar to light strip 20. Gasket 372 includes corresponding mounting openings 374 and, further, a central opening 376 for permitting communication between the wiring for light assembly 342 and, further, for the light strip, as will be more fully described below.

In addition, extending upwardly from base 348 are a plurality of mounting fasteners 382, such as mounting bolts, which extend through corresponding mounting openings 384 provided in frame 350 for securing frame 350 and base 348 together. In the illustrated embodiment, fasteners 382 are secured to frame 350 by nuts **382*a*. However, it should be understood that other mounting arrangements may be used to assemble light assembly 342**.

Referring again to FIG. 19, the base 348 of light assembly 342 includes side walls 386 and end walls 388 with the end wall facing the base 18 having an opening 390, which is profiled similar to the profile of base 18 and light strip 20 when inserted into base 18. In this manner, as previously noted, light assembly 342 may provide a terminal member for base 18. In addition, light assembly 342 provides a conduit for the connection to light strip 20 to the respective voltage supply, including the vehicle voltage supply. For example, as noted above, light assembly 342 may be located over an opening in the mounting surface of the vehicle through which the wiring is passed through to thereby couple to the vehicle electrical system, such as to the vehicle battery.

Figure 21:
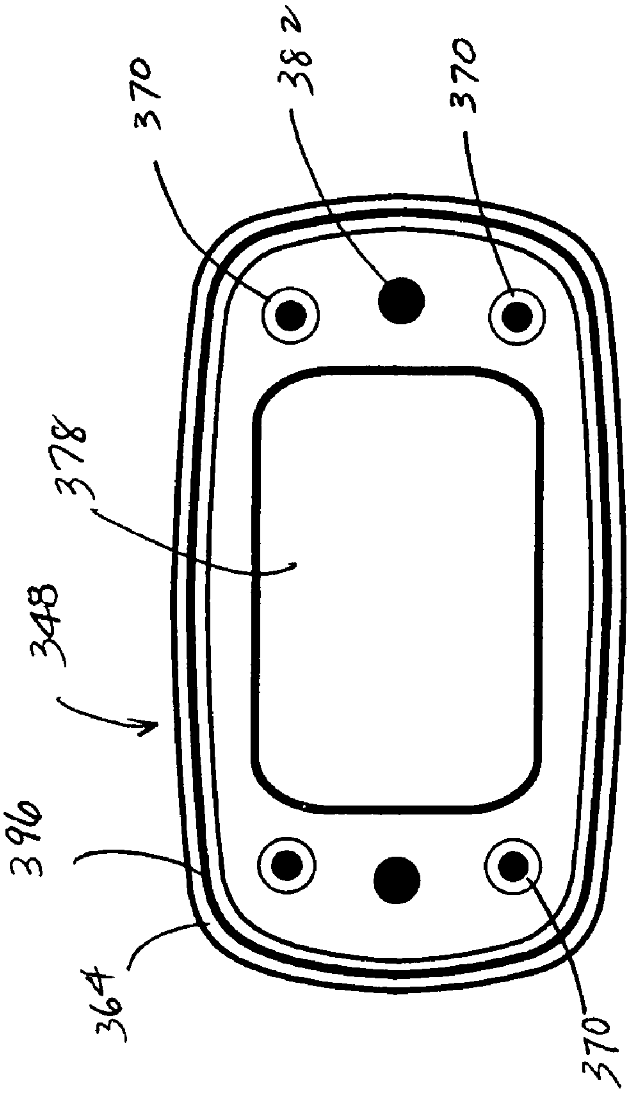
FIG. 21 is a top plan view of the base of the light assembly of FIG. 20.
Figure 22:
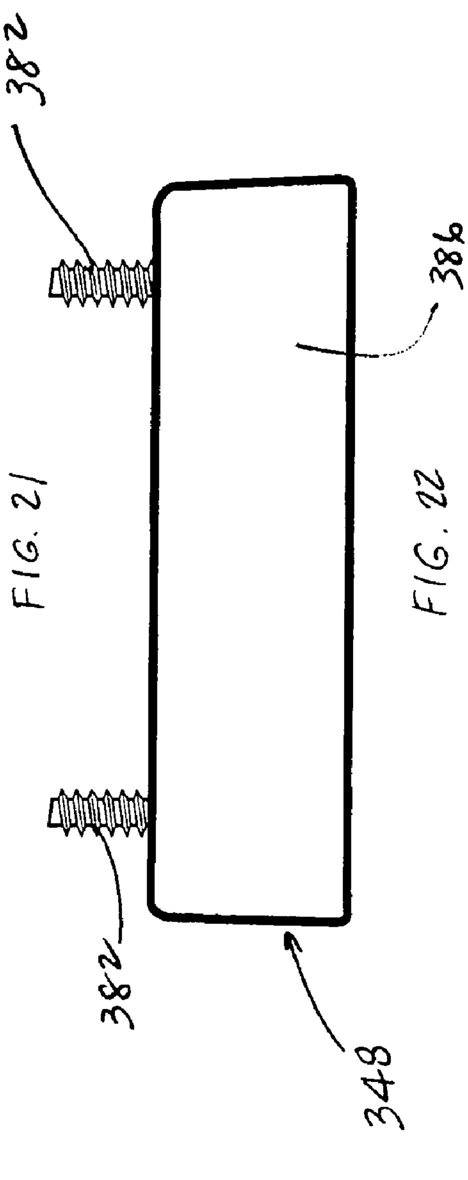
FIG. 22 is a side elevation view of the base of FIG. 21.

Optionally, referring to FIG. 21, base 348 may include along upper edge 364 a seal for mating with seal 362 or for mating with a perimeter ridge or the like formed on cover 352 to thereby form a sealed light assembly. Alternately, upper edge 364 may include a recess for receiving the respective seal 362 of cover 352.

Figure 24:
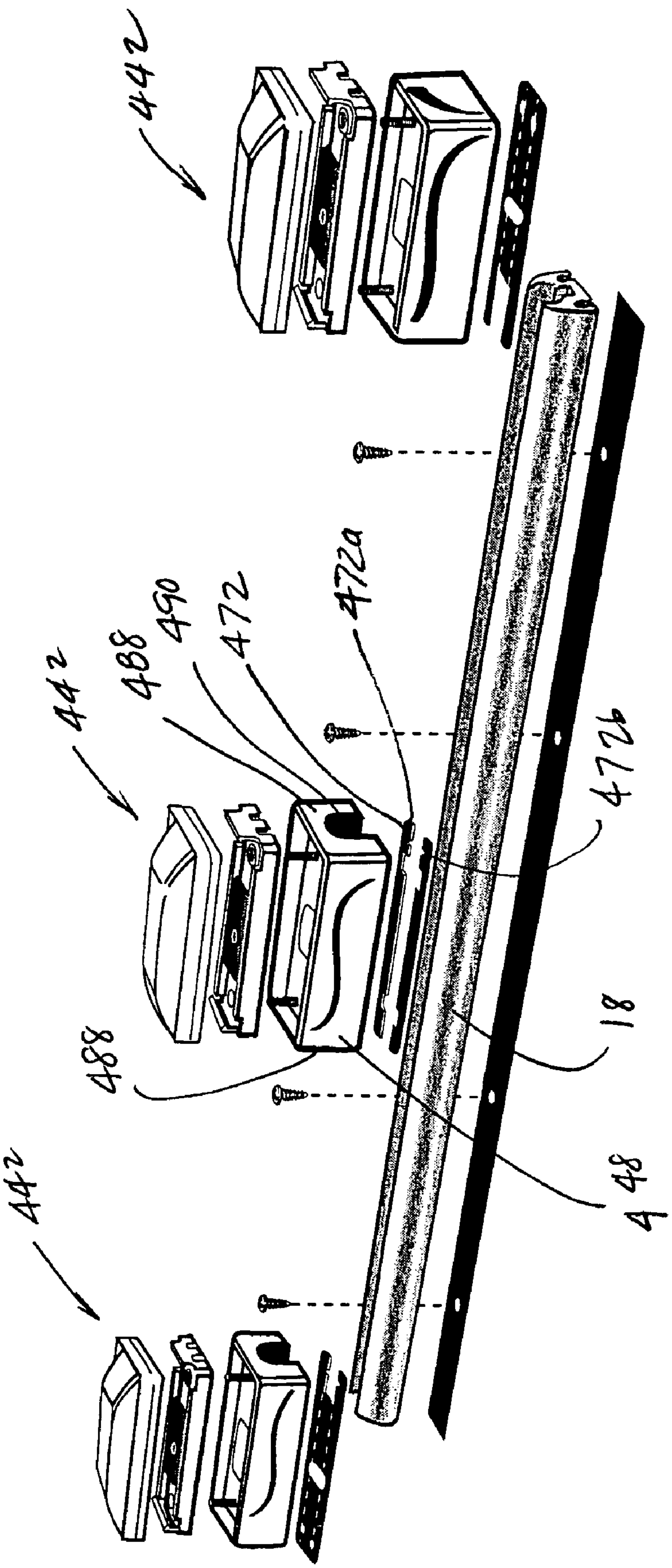
FIG. 24 is an exploded perspective view of yet another embodiment of the lighting system of the present invention incorporating three additional light assemblies.
Figure 25:
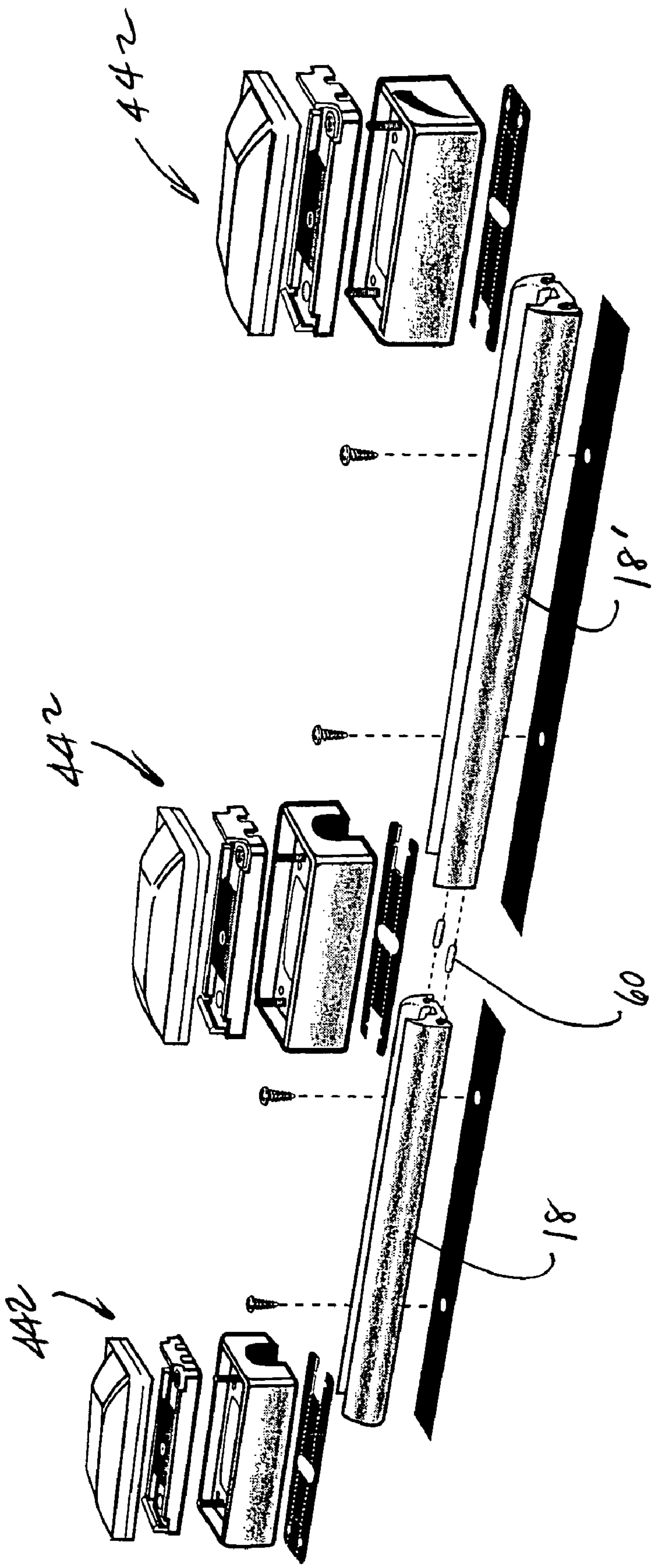
FIG. 25 is a similar view to FIG. 24 illustrating the middle light assembly positioned over adjoining sections of the base of the light assembly.
Figures 25A, 25B, 25C:
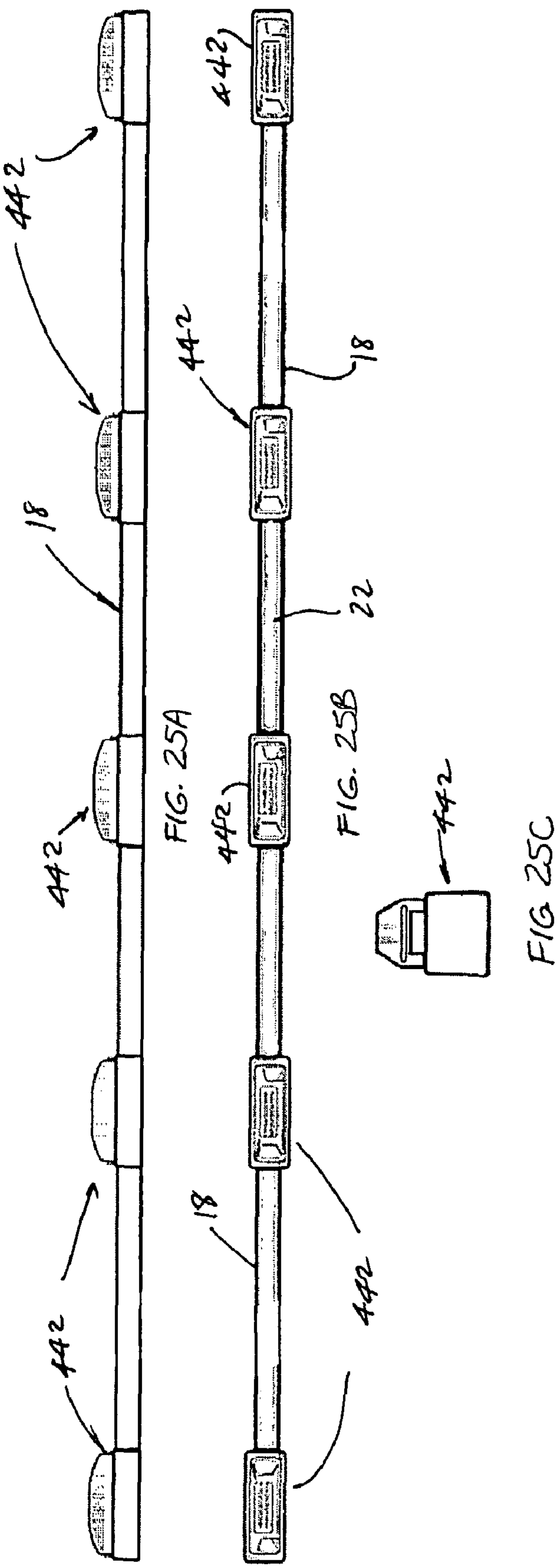
FIG. 25A is an elevation view of a lighting system similar to the lighting system of FIG. 25 incorporating additional bases and light assemblies.
FIG. 25B is a plan view of the lighting system of FIG. 25A.
FIG. 25C is an end view of the lighting system illustrated in FIGS. 25A and 25B.
Figure 26:
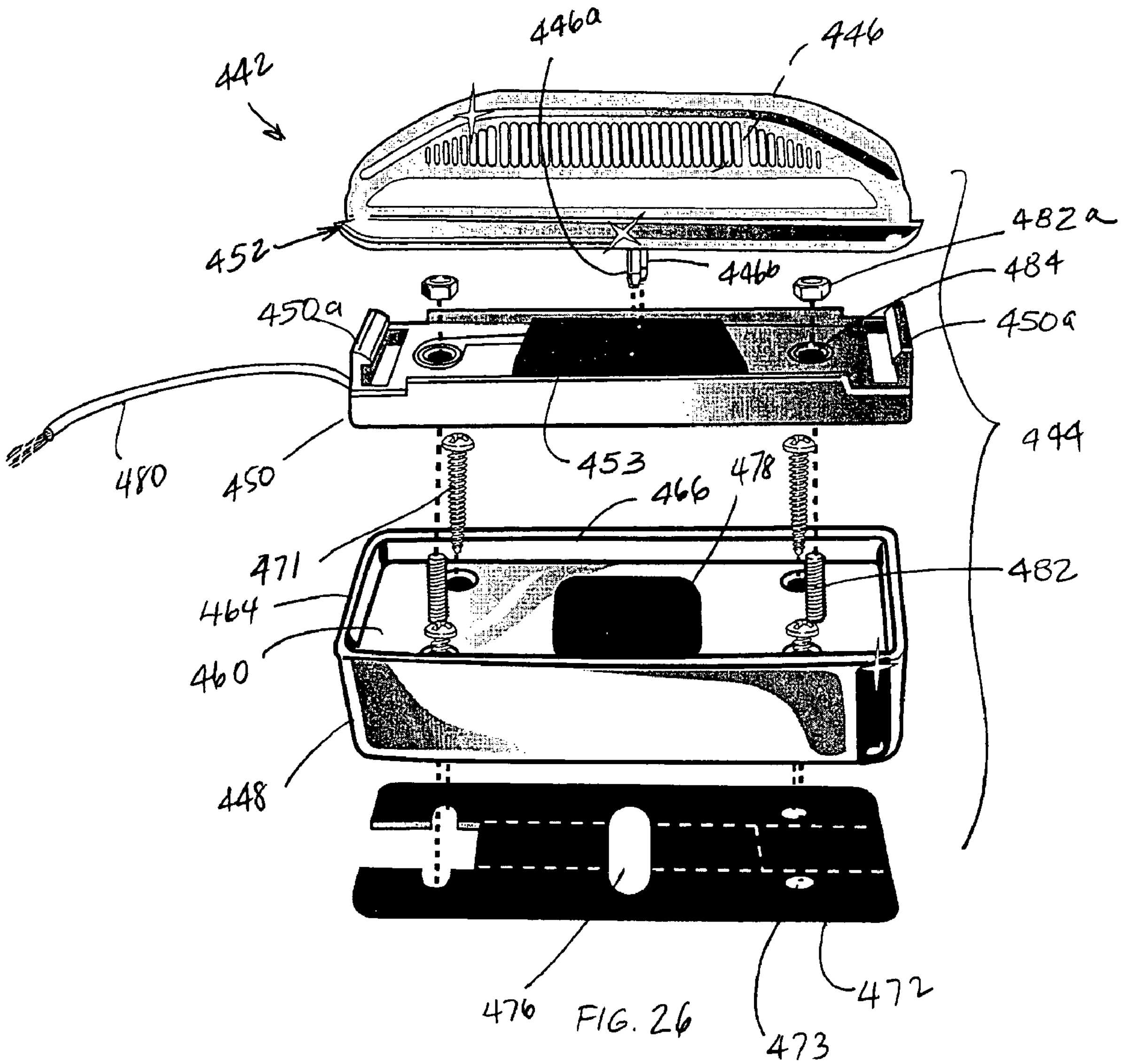
FIG. 26 is an exploded perspective view of the light assemblies of FIGS. 24 and 25.
Figure 27:
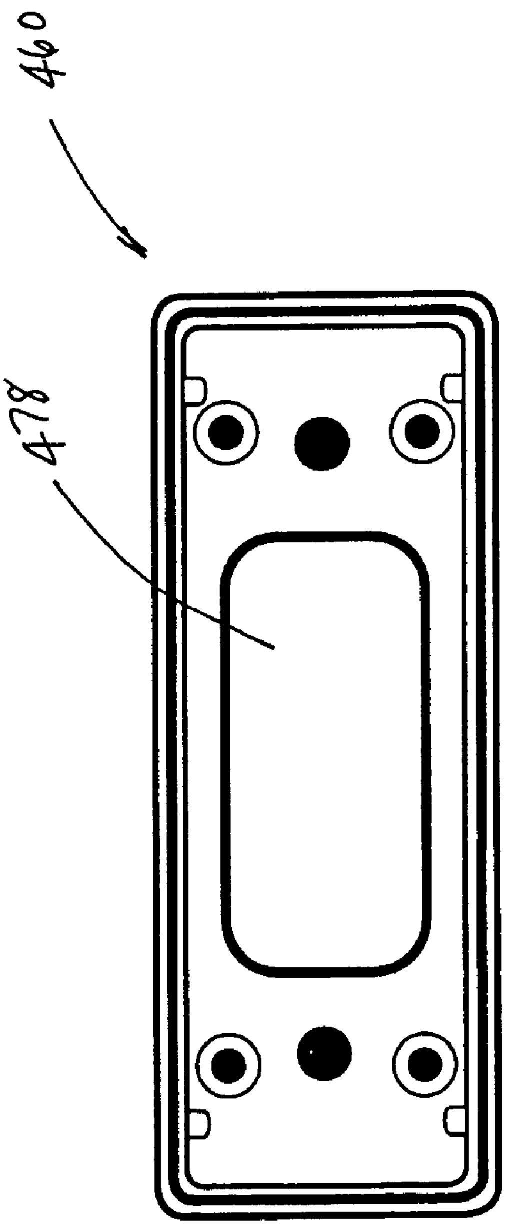
FIG. 27 is a top plan view of the base of the light assembly of FIG. 26.
Figure 28:
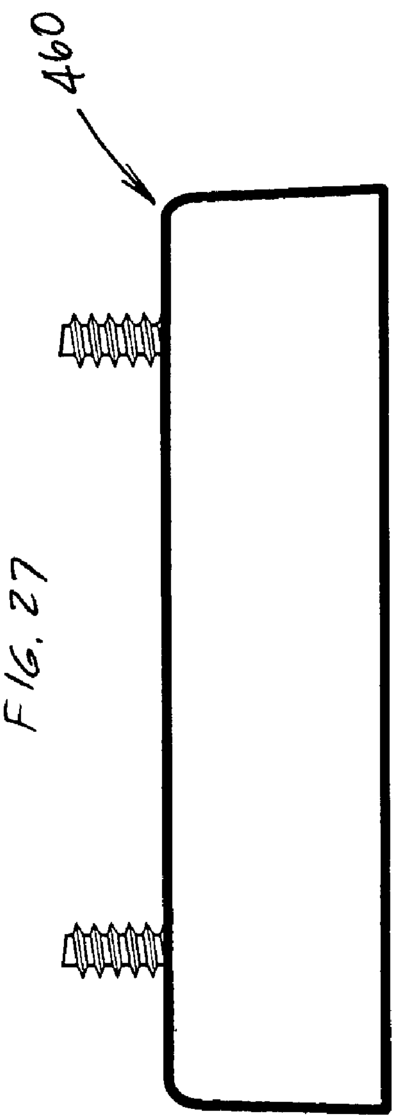
FIG. 28 is a side elevation view of the base of FIG. 27.
Figure 29:
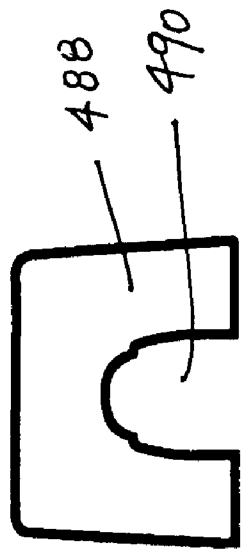
FIG. 29 is an end view of the base of FIGS. 27 and 28.

Referring to FIG. 24, it should be understood that a light assembly may be positioned at an intermediate location between the terminal ends of the base 18 in which case, the base of light assembly 342 would include a transverse passageway that extends from one end wall to the other end wall of the base to accommodate the base and light strip. Similarly, as illustrated in FIG. 25, an intermediate light assembly may be provided, which is positioned over a pair of terminal ends of a pair of bases 18, 18'. Optionally, the respective bases 18 and 18' may be interconnected by couplers 60 or may be spaced apart with the light assembly providing terminal members for both bases.

Where the light assembly is not aligned over a passageway or opening in the mounting surface, the wiring for the respective light assembly may be extended through the lower portion 64*c* of recess 64*a* of the respective base for coupling to the power supply through an opening located preferably under another light assembly or an end cap.

Referring to FIGS. 26–29, light assembly 442 is of similar construction to light assembly 342 in that light assembly 442 includes a housing 444 for containing one or more light sources 446. Housing 444 includes a base 448, a frame 450, and a cover 452, with frame 450 supporting a circuit board or circuitry 453 for powering a light source or light sources 446. In the illustrated embodiment, light source 446 comprises a single light source with a pair of contacts 446*a* and 446*b* for coupling to the circuit board or circuitry 453. For example, light source 446 may comprise a conventional incandescent light source or fluorescent light source or an LED.

Housing 444 is similarly assembled by a plurality of fasteners 471 and 482, with fasteners 482 extending from housing 448 through mounting openings 484 provided in frame 450 which is secured thereto by nuts 482*a*. Cover 452 similarly extends over frame 450. In the illustrated embodiment, frame 450 includes a pair of attachment arms 450*a* that engage the ends of cover 452 with a snap-fit connection. Furthermore, frame 450 mounts in a recess 460 of base 448 and, preferably, includes a seal (not shown) for sealing against, for example, against upper edge 464 of perimeter wall 466 of base 448.

Base 448 similarly includes a central opening 478 to permit the wiring 480 of the circuitry or circuit board 453 to pass through and couple to a voltage supply similar to the previous embodiment. In addition, light assembly 442 includes a gasket 472 that is provided with a plurality of mounting openings 473 to permit the respective fasteners 471 to extend through gasket 472 to the mounting surface of the vehicle, for example. In addition, gasket 472 includes a central opening 476 to permit the wiring 480 to pass through the mounting surface of the vehicle for connection to the voltage supply, which is preferably located within the vehicle, such as the vehicle trailer or cab, or the like. In addition, as would be understood, when light assembly 442 is used as an intermediate light assembly, gasket 472 comprises two gasket portions 472*a* and 472*b* for straddling base 18. In addition, both ends walls 488 of base 448 preferably include an opening 490, which is profiled similar to the profile of base 18 and light strip 20 so that assembly 442 can straddle base 18.

Figure 30:
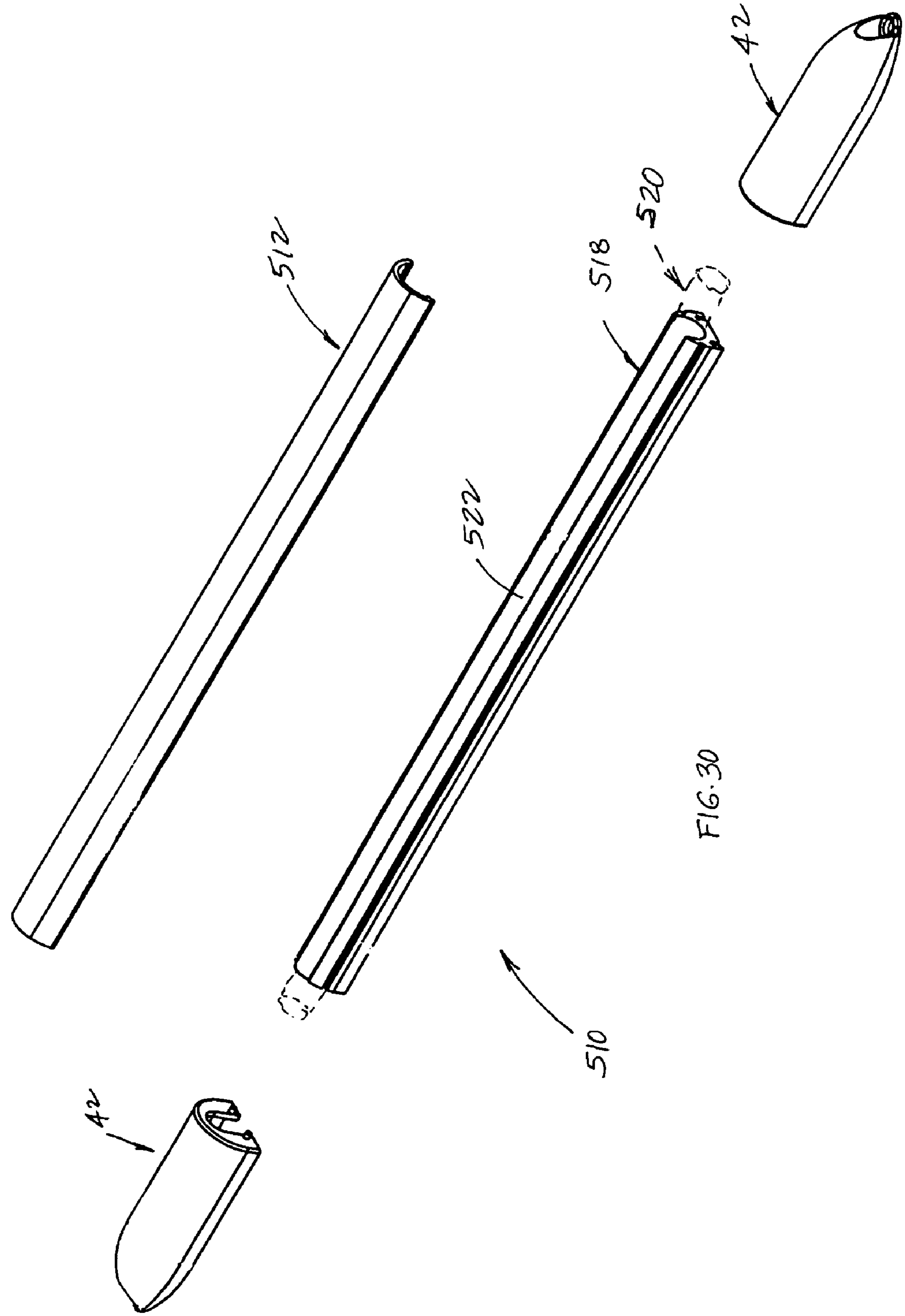
FIG. 30 is an exploded perspective view of yet another embodiment of the lighting system of the present invention incorporating a cover over the base.

Referring to FIG. 30, the numeral 510 designates another embodiment of the lighting system of the present invention. Lighting system 510 incorporates a base 518, which is of similar construction to base 18 described in reference to the previous embodiments, and a light strip 520. For further details of light strip 520 reference is made to light strip 20 described in the previous embodiments. Lighting system 510 also includes terminal members 542, which have also been described previously.

In the illustrated embodiment, light system 510 incorporates a cover 512 that extends over groove 522 of base 518 to thereby cover light strip 520. Cover 512 is preferably formed from a plastic material, including, for example a polycarbonate material and may incorporate optical surfaces to direct the light from the light sources provided in light strip 520 in a desired pattern.

Figure 32:
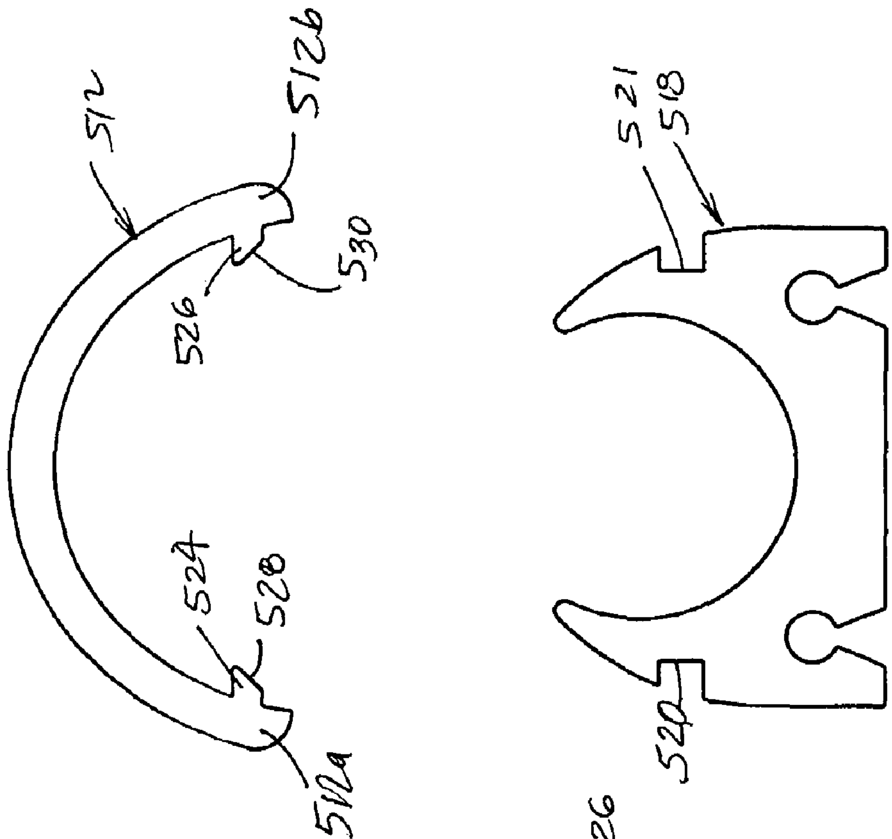
FIG. 32 is an exploded view of the base and cover of FIG. 31.
Figure 31:
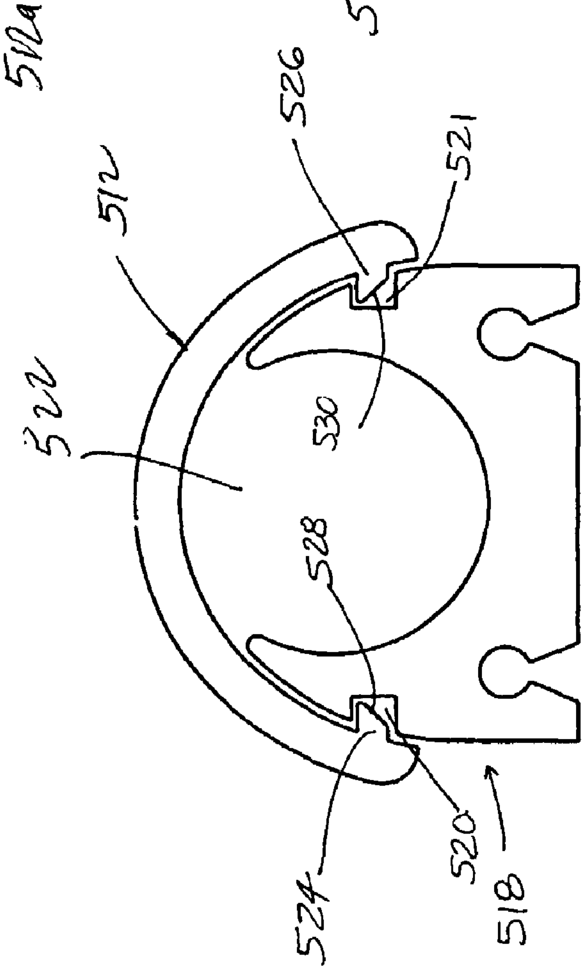
FIG. 31 is a cross-sectional view of the base and cover.

Referring to FIGS. 31 and 32, cover 512 is adapted to releasably engage base 518. In the illustrated embodiment, base 518 incorporates a pair of opposed longitudinal grooves 520 and 521, which extend along the full length of the base 518. Cover 512 includes a corresponding pair of inwardly projecting tabs 524 and 526 that are adapted to releasably engage grooves 520 and 521 to thereby releasably couple cover 512 to base 518. To facilitate the installation of cover 512 onto base 518, inwardly projecting tabs include cam surfaces 528 and 530 which initially urge the edge portions 512*a* and 512*b* of cover 512 outwardly when cover 512 is pressed onto base 518 until tabs 524 and 526 are extended into recesses 520 and 521, which provides a snap-fit connection of cover 512 to base 518.

It should be understood, however, that recesses 520 and 521 may comprise a plurality of spaced discrete recesses 520 and 521, which correspond to a plurality of spaced tabs formed on the inner surfaces of cover 512 to provide a similar snap-fit connection.

Once cover 512 is mounted to base 518, cover 512 thereby provides protection to light strip 520, which is positioned in groove 522. In addition, as previously noted, cover 512 may be provided to adjust the pattern of light from the respective light sources of light strip 520. Furthermore, cover 512 may comprise a colored cover to impart light to the light generated by the light sources in light strip 520.

From the foregoing, it can appreciated that the present invention provides a lighting system which is particularly suitable for use as a running light strip that incorporates modular construction to permit easy assembly and, further, to permit customization to suit a customer's needs. Furthermore, the lighting systems of the present invention provide a linear illumination system generates a substantially continuous line of light to create what appears to be a seamless line light. Furthermore, where the lighting system incorporates marker lights, the marker lights may be independently operated from the light strip or strips, which may conserve power. It also can be appreciated that the present invention provides a wire management system to allow lights to be positioned between access openings on the vehicle body.

While several forms of the invention have been shown and described, other forms will now be apparent to those skilled in the art. Though described in reference to a tractor-trailer or truck, as noted above, the present inventions may also be used on other trailers or vehicles, such as utility trailers, camping trailers, RVs, watercraft, including boats, personal watercrafts, snowmobiles, or all terrain vehicles (ATVs); or on garage doors; building structures; signs or the like. Therefore, it will be understood that the embodiments shown in the drawings and described above are merely for illustrative purposes, and are not intended to limit the scope of the invention, which is defined by the claims which follow as interpreted under the principles of patent law including the doctrine of equivalents.

I claim:

1. A vehicular lighting system comprising:

an elongated mounting base having a body, said body having a central portion with a central bearing surface for contacting a mounting surface, said body including a pair of flanges having upwardly depending portions extending from said central portion and downwardly depending portions extending from said central portion, said downwardly depending portions forming bearing surfaces spaced from said central bearing surface for contacting the mounting surface, and said central portion having an elongated groove opposed from said central bearing surface, said elongated groove extending along said base, said elongated groove and inner surfaces of said flanges defining an elongated receptacle; and a flexible light strip positioned and retained in said receptacle by said flanges, said light strip being substantially contained within said receptacle, and said light strip comprising a substantially transparent polymeric body and a plurality of light sources encapsulated in said polymeric body, and said light strip having contacts for electrically coupling said light sources to a power supply.

2. The lighting system according to claim 1, wherein said light sources comprise light emitting diodes.

3. The lighting system according to claim 1, wherein said polymeric body comprises a polyvinyl chloride body.

4. The lighting system according to claim 1, wherein said lower portions of said flanges and said central portion form therebetween recesses.

5. The lighting system according to claim 4, wherein said recesses between said lower portions of said flanges and said central portion comprise mounting openings, said mounting openings for receiving couplers.

6. The lighting system according to claim 5, said base comprising a first base, further comprising a second base, said second base being coupled to said first base by couplers, said couplers extending into said mounting openings of said respective bases to thereby couple said bases together, wherein said light strip comprises a light strip extending through both of said receptacles of said respective bases to form a longer lighting system.

7. The lighting system according to claim 6, wherein said couplers comprise pins.

8. The lighting system according to claim 7, wherein said pins comprises coiled spring pins.

9. The lighting system according to claim 1, further comprising terminal end members, said terminal end members coupling to opposed ends of said base and for securing at least end portions of said base to the vehicle.

10. The lighting system according to claim 1, wherein said elongated groove has an upper portion and a lower portion, said upper portion and said inner surfaces of said flanges defining said elongated receptacle.

11. The lighting system according to claim 1, wherein said elongated receptacle comprises a round elongated receptacle.

12. The lighting system according to claim 1, further comprising a light assembly, said light assembly mounted over said light strip and said base.

13. The lighting system according to claim 12, wherein said light assembly comprises a housing and at least one light source in said housing, said light source of said light assembly being adapted for coupling to a power supply.

14. The lighting system according to claim 13, wherein said housing comprises a housing base, said housing base having a transverse passage therethrough for receiving said light strip and said mounting base wherein said light assembly provides a supplemental illumination source to said light strip.

15. The lighting system according to claim 14, wherein said light assembly is mounted to an end portion of said mounting base to thereby form a terminal member for said mounting base.

16. The light assembly according to claim 14, wherein said light source of said light assembly and said light sources of said light strip are electrically coupled to the same power supply.

17. The lighting system according to claim 1, further comprising terminal end members, said terminal end members coupling to opposed ends of said base and for securing at least end portions of said base to the vehicle.

* * * * *